US007110677B2

(12) United States Patent
Reingand et al.

(10) Patent No.: US 7,110,677 B2
(45) Date of Patent: Sep. 19, 2006

(54) METHOD AND SYSTEM FOR OPTICAL TIME DIVISION MULTIPLEXED FIBER COMMUNICATIONS WITH COHERENT DETECTION

(75) Inventors: Nadejda Reingand, Baltimore, MD (US); Jacob Khurgin, Baltimore, MD (US); Pak Shing Cho, Gaithersburg, MD (US)

(73) Assignee: CeLight, Inc., Silver Spring, MD (US)

( * ) Notice: Subject to any disclaimer, the term of this patent is extended or adjusted under 35 U.S.C. 154(b) by 684 days.

(21) Appl. No.: 09/962,339

(22) Filed: Sep. 26, 2001

(65) Prior Publication Data

US 2003/0058499 A1    Mar. 27, 2003

(51) Int. Cl.
*H04J 14/08*   (2006.01)
*H04J 4/00*    (2006.01)
*H04B 10/06*   (2006.01)

(52) U.S. Cl. .................. 398/98; 398/204; 398/74; 398/205

(58) Field of Classification Search .................. 398/98, 398/204, 205, 74
See application file for complete search history.

(56) References Cited

U.S. PATENT DOCUMENTS

| 4,718,120 A | 1/1988 | Tzeng ..................... 455/619 |
| 5,060,312 A | 10/1991 | Delavaux ................ 359/192 |
| 5,111,322 A | 5/1992 | Bergano et al. .......... 359/122 |
| 5,115,332 A | 5/1992 | Naito et al. .............. 359/189 |
| 5,146,359 A | 9/1992 | Okoshi et al. ............ 359/189 |
| 5,473,463 A | 12/1995 | van Deventer ........... 359/192 |
| 5,493,433 A | 2/1996 | Prucnal et al. ........... 359/123 |
| 5,786,918 A * | 7/1998 | Suzuki et al. .............. 398/98 |
| 5,959,753 A | 9/1999 | Durling, III et al. ...... 359/158 |
| 2002/0181041 A1* | 12/2002 | Tong ........................ 359/123 |
| 2003/0072051 A1* | 4/2003 | Myers et al. ............. 359/115 |

* cited by examiner

*Primary Examiner*—Dalzid Singh

(57) ABSTRACT

The present invention relates to a receiver for receiving a time division multiplexed (TDM) optical signal, which is formed of a plurality of interleaved optical pulse streams. Each optical pulse stream includes a plurality of optical pulses. The receiver includes a detector for detecting at least a first optical pulse stream of the optical signal and an optical hybrid for coherently mixing the first optical pulse stream with a reference pulse stream. The first optical pulse stream and the reference pulse stream impinge simultaneously upon the detector.

11 Claims, 29 Drawing Sheets

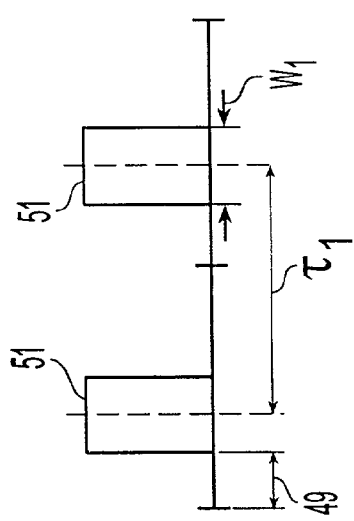
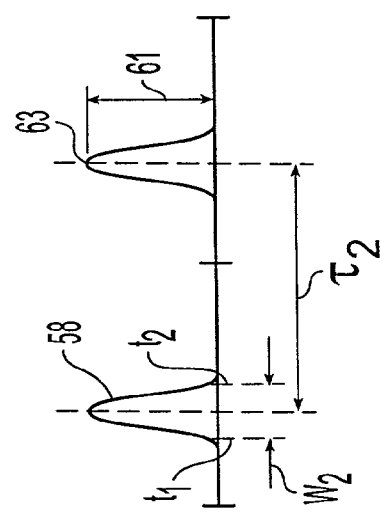

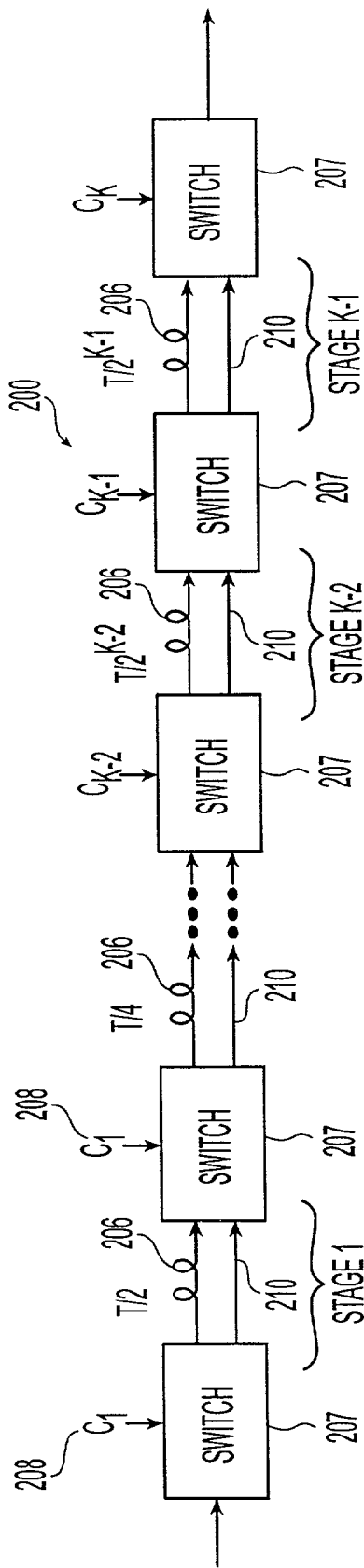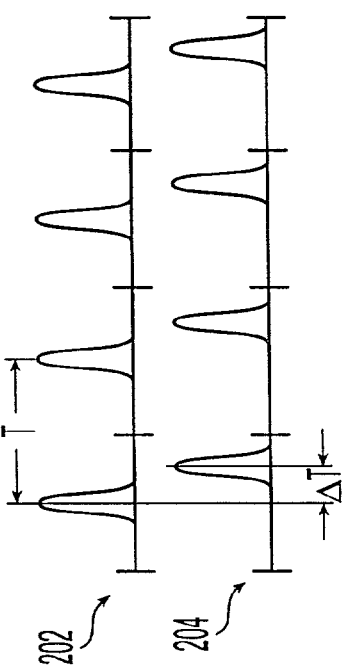
Fig. 5b
(Prior Art)
Fig. 5a

METHOD AND SYSTEM FOR OPTICAL TIME DIVISION MULTIPLEXED FIBER COMMUNICATIONS WITH COHERENT DETECTION

FIELD OF THE INVENTION

The present invention relates to optical time-division multiplexed (OTDM) communication systems using a coherent detection to recover information from different information carrying channels.

BACKGROUND OF THE INVENTION

In optical time division multiplexing (OTDM) systems, each of N optical pulse streams is modulated with information from a respective data stream. Each of the N optical pulse streams is formed from a plurality of optical pulses. The N optical pulse streams are interleaved in time to produce a single optical signal, which is transmitted into an optical network. The optical signal also includes a stream of framing pulses. Thus, the optical signal comprises N+1 optical pulse streams. The framing pulse stream is a stream of periodic pulses that generally do not carry information from a data source but are used as a time reference at the receiving end of the system to facilitate recovery of information from the N information-carrying optical pulse streams.

To generate the N optical pulse streams and the framing pulse stream, a light source, for example, a mode-locked laser, is used to generate a periodic train of pulses with widths on the order of a few tens of picoseconds (ps) or less. The laser pulse width is much shorter than the bit period T, which is the time period between consecutive pulses from the laser. The laser output is split into N+1 channels. Once the laser output has been split into N+1 channels, each of N optical pulse streams is modulated by a respective data source. The framing pulse stream is generally not modulated.

Various optical properties of the pulses of the N optical pulse streams can be modulated to encode information from a digital data source. When light intensity is modulated between at least two values, the modulation technique is amplitude shift keying (ASK). When the phase of the light is modulated between at least two angular values, the modulation technique is phase shift keying (PSK). The N modulated optical pulse streams are then interleaved with one another and with the framing pulse stream to form the optical signal. The N+1 optical pulse streams are interleaved such that pulses of different pulse streams do not overlap with one another.

In a bit interleaved OTDM stream, the ith optical pulse stream, where i=1, 2, . . . , N is delayed by $i\tau$, where $\tau=T/(N+1)$. Generally, the pulse width of each pulse is shorter than $\tau$, which is the bit interval in the optical signal. The framing pulse stream is typically undelayed. The delays offset pulses of the N optical pulse streams and framing pulse stream from one another by a time $\tau$. Thus, when interleaved, the pulses of the N delayed data streams and the framing pulse stream do not overlap with one another.

At the receiving end of an OTDM system, the data carried by the N data streams is recovered. Data recovery in OTDM systems includes both selection, which is the separation of a particular channel from the other pulse streams in the optical signal and the demodulation of information from the separated channel. In certain cases, the pulses of the framing pulse stream can be used to assist demodulating a pulse stream. For example, in bit interleaved OTDM systems, sequential pulses of the framing pulse stream are spaced apart by a time period T that is equal to the time period between sequential pulses in each of the N information carrying channels. To demodulate a particular pulse stream, the framing pulses are first offset in time so that each framing pulse is temporally aligned with a corresponding pulse of the channel to be demodulated. Subsequently, a logical AND operation is performed between the pulses of the information carrying channel and the framing pulse stream to select a particular pulse stream to be modulated.

A number of methods have been proposed to perform the logical AND operation. A first method is a nonlinear optical loop mirror (NOLM). A NOLM includes a 3-dB directional coupler and a fiber loop connecting both outputs of the coupler. Another coupler is used for insertion of control pulses. The input signal splits into clockwise and counter-clockwise streams after passing the coupler. These streams gain different phase shifts while propagating around the loop due to the non-linearity of silica fiber itself. Depending on the phase shift each stream acquires propagating around the loop, the two streams will experience constructive or destructive interference at the coupler. In NOLM systems it is necessary to either use a long fiber of about a few kilometers or to use pulses having a high peak power in order to get pulse switching because silica fiber possesses only weak non-linearity.

The second configuration is called a terahertz optical asymmetric demultiplexer (TOAD), as disclosed in U.S. Pat. No. 5,493,433 to Prucnal et al. The TOAD includes a separate non-linear element (NLE) in the loop to change the phase shift acquired by each stream. The non-linear properties of the NLE are controlled by control pulses. Therefore, the fiber loop includes another coupler for insertion of control pulses. The separate non-linear element can be, for example, a semiconductor optical amplifier (SOA), which is driven into saturation by the control pulse. The control signal and the first signal must pass the SOA after the second signal passed it. In this case the first signal experiences a phase shift due to the amplifier saturation. Because the resulting interference will not be completely destructive, the device will produce an output signal. In TOAD systems, pulse synchronization and SOA optimization are technically complicated.

Another approach to performing the logical AND operation is by use of a soliton trapping AND gate, such as that disclosed in U.S. Pat. No. 4,932,739 to Islam. This method utilizes the property of solitons with orthogonal polarization states to propagate in a birefringent fiber with the same group velocity. While propagating along the fiber these two solitons are subjected to the wavelength shifts in opposite directions, and the narrowband output selector can register the signal at the shifted wavelength. However, the technique is complicated by the long fiber lengths that must be used to achieve the soliton trapping effect.

Known optical AND gates do not themselves recover information from optical pulse streams. Rather, receivers using such AND gates require an additional element, such as a detector that operates on a direct detection principal, to recover information from the output of the AND gate.

The rate and efficiency of optical communication using TDM systems would greatly benefit by finding a faster and more sensitive approach to demodulating and demultiplexing optical signals encoded as time division multiplexed optical signals.

Coherent optical detection exploits the coherence properties of the transmitted optical signal. Generally, the optical signal is mixed with a signal from a local oscillator, which is typically a laser at the receiving end of the system. Because of the mixing, coherent detection can be modeled as a type of optical interferometry. The signal intensity resulting from the mixed signals is detected by a photoreceiver, such as a photodiode.

An advantage of coherent detection over direct detection is the higher sensitivity at the receiving end in coherent detection. As shown by R. Ramaswami, K. N. Sivarajan "Optical Networks: A Practical Perspective", 1998, the coherent homodyne receiver sensitivity for bit error rates (BER) of $10^{-12}$ is 49 photons per 1 bit, while direct detection pinFET receiver without preamplifier has a sensitivity on the order of a few thousands photons per 1 bit, and preamplified receivers have the sensitivity of a few hundred photons per 1 bit to obtain a BER of $10^{-12}$.

A variety of optical schemes have been proposed for coherent optical receivers. One configuration, the single branch receiver, includes a 3-dB coupler (or beam splitter in a free space version), a local oscillator and a photo detector. Improved efficiency is achieved by a configuration using two identical photodiodes connected to two outputs of the coupler as disclosed in U.S. Pat. No. 4,596,052 to Wright et al. The resulting output signal is the difference of the signals from the two photodiodes, and it is equal to that of single branch photoreceiver. The power, however, of the local oscillator is more efficiently used. More advantageous receivers have been developed based upon polarization diversity (U.S. Pat. No. 4,718,120 to Tzeng, U.S. Pat. No. 5,060,312 to Delavaux) and phase diversity (U.S. Pat. No. 5,115,332 to Naito et al., U.S. Pat. No. 5,146,359 to Okoshi et al., and U.S. Pat. No. 5,081,712 to Meissner) ones which are insensitive to fiber-induced fluctuations of the signal polarization state and phase.

SUMMARY OF THE INVENTION

One embodiment of the invention relates to a time division multiplex optical communication receiver for processing a received time division multiplexed (TDM) optical signal comprising a plurality of interleaved optical pulse streams, each optical pulse stream including a plurality of optical pulses. The receiver comprises a light sensitive detector for detecting at least a first optical pulse stream of the TDM optical signal and an optical hybrid to coherently mix the first optical pulse stream and a second optical pulse stream. Pulses of the first and second optical pulse streams impinge simultaneously upon the detector. The second optical pulse stream is preferably a framing pulse stream of the TDM optical signal. In another embodiment the TDM optical signal is received from a first transmitter and the second optical pulse stream is received from a second, different transmitter.

The receiver preferably performs a coherent detection process, which selects and demodulates a first optical pulse stream from the received TDM optical signal. By selects it is meant that the optical pulse stream and a second optical pulse stream are synchronized and coherently mixed before being detected. By coherently mixed it is meant that complex amplitudes of pulses of the first and second optical pulse streams are summarized. The coherent mixing is preferably performed using a an optical hybrid. By demodulation it is meant that information is recovered from the first optical pulse stream, preferably in the form of an electrical signal.

The receiver preferably selects and demodulates the first optical pulse stream. In one embodiment, the second optical pulse stream is a framing pulse stream of the TDM optical signal. In another embodiment the TDM optical signal is received from a first transmitter and the second optical pulse stream is received from a second, different transmitter. For example, the first transmitter can be a remote transmitter and the second transmitter is a local transmitter. The receiver preferably includes a synchronization device to synchronize pulses of the first optical pulse stream with pulses of the second optical pulse stream. The synchronization device and the optical hybrid select the first optical pulse stream.

Optical pulses of the TDM signal preferably have a width of less than about 100 ps. The optical pulses of the TDM signal preferably comprise at least one of return-to-zero pulses, and short pulses. The receiver is preferably a balanced receiver, such as a phase-diversity receiver or a phase-polarization diversity receiver. The TDM signal is preferably encoded with at least one of amplitude shift keying, phase shift keying, differential phase shift keying, and polarization shift keying.

Another embodiment of the invention relates to a time division multiplex system for processing a received time division multiplexed (TDM) optical signal comprising a plurality of interleaved optical pulse streams. The system comprises a local transmitter for producing at least a first optical pulse stream and a light sensitive detector for detecting a received optical pulse stream of the received TDM optical signal. An optical hybrid is configured to coherently mix the first optical pulse stream and the received optical pulse stream, whereby pulses of the first and received optical pulse streams impinge simultaneously upon the detector.

In a preferred embodiment, a locking device locks a bit rate of the first local optical pulse stream to a bit rate of the received TDM optical signal.

The local transmitter can be configured to transmit a locally-transmitted TDM optical signal. A locking device is preferably configured to lock a bit rate of the locally-transmitted TDM optical signal to a bit rate of the received TDM optical signal.

Another embodiment of the invention relates to a time division multiplex optical communication receiver for processing a received time division multiplexed (TDM) optical signal comprising a plurality of interleaved optical pulse streams, each optical pulse stream including a plurality of optical pulses. The receiver comprises a light sensitive detector for detecting at least a first optical pulse stream of the TDM optical signal and an optical hybrid to coherently mix the TDM optical signal with a second optical pulse stream, whereby pulses of the first and second optical pulse streams impinge simultaneously upon the detector.

Yet another embodiment of the invention relates to a time division multiplex system for processing a received time division multiplexed (TDM) optical signal comprising a plurality of interleaved optical pulse streams. The system comprises a local transmitter for producing at least a first optical pulse stream and a light sensitive detector for detecting a received optical pulse stream of the received TDM optical signal. An optical hybrid configured to coherently mix the TDM optical signal and the received optical pulse stream, whereby the first and received optical pulse streams impinge simultaneously upon the detector.

Another embodiment of the invention relates to a wavelength and time division multiplex receiver for processing a received wavelength division multiplexed (WDM) optical signal comprising a plurality of time-division multiplexed (TDM) optical signals, each TDM optical signal having a respective wavelength. The receiver comprises a demultiplexer to demultiplex the WDM optical signal to thereby provide a plurality of demultiplexed TDM optical signals, each demultiplexed TDM optical signal having a respective wavelength. The receiver includes a plurality of optical hybrids. Each optical hybrid is configured to receive a respective one of the demultiplexed TDM optical signals and a respective second optical pulse stream. The demultiplexed TDM optical signal and second optical pulse stream received by each hybrid have the same wavelength. The second optical pulse stream is preferably a framing pulse stream. The optical hybrid coherently mixes the received demultiplexed TDM optical signal and the second optical pulse stream.

The receiver includes a plurality of detectors. Each detector is optically associated with a respective optical hybrid, whereby pulses of the respective one of the demultiplexed TDM optical signals and the respective reference optical pulse stream, which were mixed by the optical hybrid, impinge simultaneously upon the detector.

Another embodiment of the invention relates to a time division multiplex method for processing a received time division multiplexed (TDM) optical signal comprising a plurality of interleaved optical pulse streams, each optical pulse stream comprising a plurality of pulses. The method includes detecting at least a first optical pulse stream of the TDM optical signal and coherently mixing the first optical pulse stream and a second optical pulse stream, whereby pulses of the first and second optical pulse streams interfere.

Another embodiment of the invention relates to a time division multiplex method for processing a received time division multiplexed (TDM) optical signal comprising a plurality of interleaved optical pulse streams, each optical pulse stream comprising a plurality of pulses. The method comprises detecting at least a first optical pulse stream of the TDM optical signal and coherently mixing the TDM optical signal and a second optical pulse stream, whereby pulses of the first and second optical pulse streams interfere upon being coherently detected.

Another embodiment of the invention relates to a wavelength and time division multiplex method for processing a received wavelength division multiplexed (WDM) optical signal comprising a plurality of time-division multiplexed (TDM) optical signals, each TDM optical signal having a respective wavelength. The method comprises demultiplexing the WDM optical signal to provide a plurality of demultiplexed TDM optical signals, each demultiplexed TDM optical signal having a respective wavelength. Each demultiplexed TDM optical signal is coherently mixed with a respective reference optical pulse stream. At least a first optical pulse stream of each of the demultiplexed TDM optical signals is detected.

Another embodiment of the invention relates to a receiver for receiving a time division multiplexed (TDM) optical signal. TDM signals comprise a plurality of interleaved optical pulse streams, with each optical pulse stream including a plurality of optical pulses. At least some of the optical pulses are modulated to represent information carried by one or more data streams. The encoding is preferably performed with at least one of amplitude shift keying, phase shift keying, differential phase shift keying, and polarization shift keying.

The receiver includes a detector for coherently detecting at least a first optical pulse stream of the optical signal. The detector includes at least one light sensitive element, such as a photodiode, vacuum photodiode, or photo-multiplier tube.

In a preferred embodiment, the receiver includes a splitter to split the optical signal into first and second channels. The first optical pulse stream is received by the first channel. A delay device is configured to delay the optical signal of one of the channels relative to the optical signal of the other channel. The delay between the two channels is preferably a multiple $j\tau$, where $\tau$ is given by $T/(N+1)$, where $N+1$ is the number of optical pulse streams in the TDM signal and T is the period of the light source at a transmitter sending the optical signal. The index j varies from 0 to N.

The first optical pulse stream and a subset of pulses from the other channel impinge simultaneously upon the detector. By simultaneously, it is meant that the difference $\Delta j\tau$ between a desired delay $j\tau$ and the actual delay between the channels is substantially less than the width of the pulses in the pulse stream. Preferably, $\Delta j\tau$ is less than 5% and more preferably less than 1% of the pulse width. The TDM signal preferably comprises framing pulses and the subset of pulses comprises the framing pulses. Each of the optical pulses of the TDM signal preferably has a width of less than about 2 ps. The optical pulses of the TDM signal preferably comprise at least one of return-to-zero pulses and short pulses. The TDM signal has a bit period, which is the time between successive pulses. After multiplexing, a width of the pulses is preferably less than about 20% of the bit period.

In a preferred embodiment, the receiver comprises a local oscillator, wherein, prior to impinging upon the detector, the subset of pulses is received by the local oscillator to lock the local oscillator to the frequency of the received framing pulses.

The receiver is a preferably a balanced receiver. The balanced receiver preferably comprises an optical hybrid configured to combine the subset of pulses of one of the channels and the pulses of the other channel, and wherein the detector comprises at least two photodiodes, each photodiode being configured to receive at least a portion of an output of the optical hybrid.

In another embodiment, the receiver is a phase-diversity receiver. The phase diversity receiver preferably comprises an optical hybrid configured to combine the subset of pulses of one of the channels and the pulses of the other channel, and wherein the detector comprises at least four photodiodes, each photodiode configured to receive at least a portion of the output of the optical hybrid.

In one embodiment, the receiver is a polarization phase diversity receiver.

Another embodiment of the invention relates to an optical communication system having a transmitter configured to transmit a time division multiplexed (TDM) optical signal and a receiver configured to receive the transmitted TDM optical signal. The receiver comprises a detector for coherently detecting a first optical pulse stream of the optical signal.

Another embodiment of the invention relates to a method for recovering data from a time division multiplexed (TDM) optical signal, the optical signal comprising a plurality of interleaved optical pulse streams, with each optical pulse stream including a plurality of optical pulses. The data recovery includes selecting an optical pulse stream and demodulating the information carried by the selected optical pulse stream. The data recovery is preferably performed coherently detecting the selected optical pulse stream.

A preferred embodiment of the method for data recovery comprises splitting the optical signal into first and second channels, with the first channel comprising the first optical pulse stream. The optical signal of one of the channels is delayed relative to the optical signal of the other channel. The first optical pulse stream and a subset of pulses from the optical signal of the second channel are then simultaneously detected.

BRIEF DESCRIPTION OF THE DRAWINGS

The present invention is discussed below with reference to the following drawings in which:

FIGS. 2a and 2b show pulse configurations suitable for use with the present invention;

FIG. 4b shows optical pulse streams and electronic signals associated with the operation of the receiver of FIG. 4a;

FIG. 5a shows a time difference between two un-synchronized optical pulse streams;

FIG. 5b illustrates a tuneable time delay suitable for use with receivers of the present invention;

FIG. 7b shows a first embodiment of an electronic block for processing signals received by the receiver of FIG. 7a;

FIG. 7c shows a second embodiment of an electronic block for processing signals received by the receiver of FIG. 7a;

FIG. 12b shows detail of a detector of the delay locking module of FIG. 12a;

DETAILED DESCRIPTION OF THE PREFERRED EMBODIMENT

The present invention relates to an optical communication system operating at a bit rate of at least about ten Gb/s, such as about 40 Gb/s. In a preferred embodiment, an optical time division multiplexed signal (OTDM), which includes a plurality of information-carrying optical pulse streams, is received by a receiver using a coherent detection technique.

Figure 1:
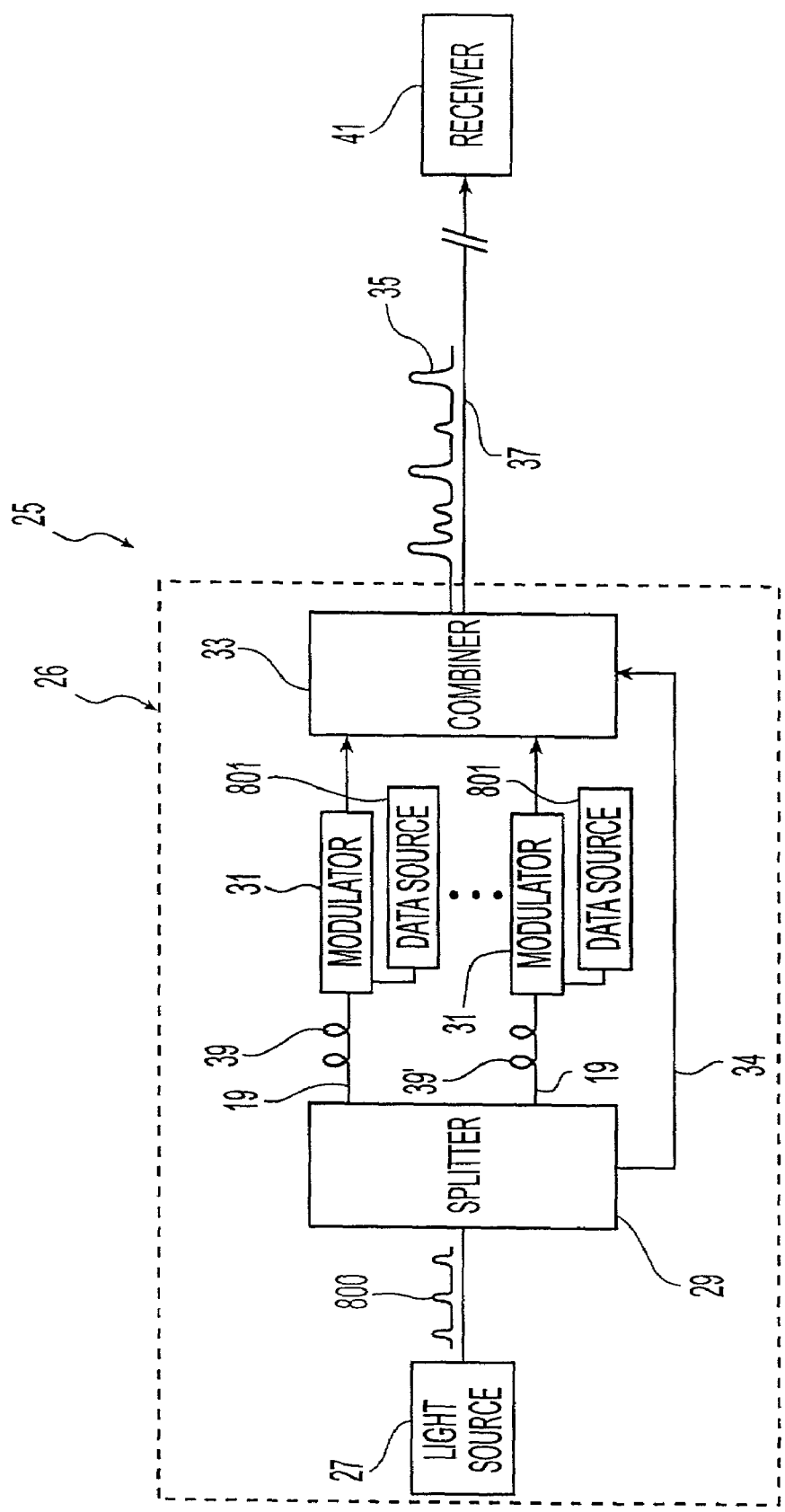
FIG. 1 is a schematic of an optical communication system of the present invention.

Referring to FIG. 1, an embodiment of a system 25 of the invention is shown. A transmitter 26 of system 25 includes a light source 27, which outputs an optical pulse stream 800 formed of optical pulses. An optical splitter 29 splits the light source output into a plurality of channels 19. Each channel carries an optical pulse stream, which preferably has pulses of substantially the same shape and spacing as the optical pulse stream 800. Each of a plurality of modulators 31 receives a respective one of the optical pulse streams output by splitter 29. Modulators 31 modulate each optical pulse stream to represent information carried by a respective data source 801. An optical pulse stream output by splitter 29 and carried by a channel 34 is preferably not modulated or delayed with respect to the optical pulse streams of the other channels. The non-modulated channel 34 provides a framing pulse stream, as discussed below. The modulated pulse streams and the framing pulse stream are received by a combiner 33.

Combiner 33 combines the modulated optical pulse streams and the framing pulse stream to form an OTDM signal 35. OTDM signal 35 is preferably transmitted, such as by at least one fiber optic cable 37 into an optical network, as understood in the art. Receiver 41 recovers information from the transmitted signal, as discussed below. System 25 can also include other elements, such as, for example, couplers, isolators, add/drop elements, amplifiers, regenerators, and the like.

Light source 27 generates periodic stream 800 of optical pulses spaced apart by a period T of about 50 to about 500 ps. The pulse width is less than about 25 ps, preferably less than about 5 ps, and most preferably less than about 3 ps. In one embodiment, the pulse width is less than about 1 ps. The light source is preferably a laser, such as a mode locked semiconductor laser or mode locked fiber laser. Examples of suitable light sources include actively-mode-locked fiber lasers, such as those of the UOC and UOC-E Series of Ultrafast Optical Clocks manufactured by PriTel, Inc., Naperville, Ill., USA.

Referring to FIGS. 2a–2b, non-limiting examples of amplitude-time plots of pulse types suitable for use with the present invention are shown. Return-to-zero (RZ) pulses 51 have a width $w_1$ that is narrower than a bit period $\tau_1$, which is the spacing in time between consecutive pulses 51. The width $w_1$ of pulses 51 is less than about 50%, preferably less than about 20%, and more preferably less than about 5% of the bit period $\tau_1$. Thus, the duty cycle of pulses 51 is less than about 0.5, preferably less than about 0.2, and more preferably less than about 0.05. In a time division multiplexed optical signal including N optical pulse streams and one framing pulse stream having a framing pulse period T, the bit period ($\tau$) is given by $\tau=T/(N+1)$.

Short pulses 58 have a width $w_2$, which is significantly narrower than a bit period $\tau_2$. Width $w_2$ of pulses 58 can be measured between $1/e^2$ points $t_1$, $t_2$, which are the points at which a pulse amplitude falls to about 13% of a maximum pulse amplitude (A). Width $w_2$ of pulses 58 is less than about 50%, preferably less than about 20%, and most preferably less than about 10% of the bit period $\tau_2$.

Short pulses 58 can be, for example, substantially Gaussian in shape or can be soliton pulses. As understood in the art, soliton pulses have a pulse shape and amplitude that allow the pulses to propagate with either a substantially unchanging pulse shape or with a slow periodic oscillation through a set of recurring pulse shapes. Thus, soliton pulses compensate for fiber dispersion so that data can be transmitted at tens or even hundreds of Gb/s without data loss caused by cross talk or temporal overlap between adjacent pulses. In a single mode fiber, an exemplary soliton pulse has a pulse width of about 3 ps, a peak power of about 100 mW, and a pulse energy of about 0.3 pJ.

Upon transmission, optical pulses suitable for use with the present invention are narrower than the bit period separating successive pulses. Thus, each bit period includes at least one period of time, such as interval 49 adjacent pulses 51, during which the light intensity is less than about 5%, of the maximum pulse intensity. The light intensity is less than about 5% of the maximum pulse intensity for at least about 80%, preferably at least about 90%, and more preferably at least about 95% of each bit period. Preferably, the light intensity is essentially zero during interval 49. In other words, the effective duty cycle of a pulse as output by the transmitter is most preferably about 5% of a bit period. It is understood that, as pulses propagate within an optical network, pulse broadening occurs, such as that caused by dispersion within optical fibers. Pulse broadening can increase the effective duty cycle of the pulses.

To encode information for transmission in optical time division multiplexed signals suitable for use with the present invention, optical properties of pulses, such as at least one of amplitude, phase, and polarization, can be modulated by modulators 31. In amplitude shift keyed (ASK) encoding, for example, the amplitude of signal pulses are modulated to represent logical 1 or logical 0. For example, the presence of a pulse may represent logical value 1 and the absence of a pulse logical value 0. Amplitude modulation of the signal can be achieved by using an electro-optic modulator, such as a 10020427 OC-192 modulator distributed by JDS Uniphase, San Jose, Calif. or an electro-absorption modulator, such as a FOEA-230 modulator distributed by JAE Electronics, Tualatin, Oreg.

Phase shift keyed (PSK) encoding is implemented by modulating the phase of pulses in a pulse stream. Phase modulation can be performed by, for example, using an electro-optic phase modulator to modulate the phase of different pulses. In a PSK signal, logic values of 1 are encoded by pulses having a first phase state, such as 0, and logic values of 0 are encoded by pulses having a second, relatively different phase state, such as 180.

Differential phase shift keyed (DPSK) encoding is a variation of PSK in which, the information is encoded in such a way that 1 corresponds to the change of phase between the current bit and the previous bit. The change of phase state gives logical 1, while 0 corresponds to no change of state. The comparison is performed in electrical signal domain.

In quadrature phase shift keying (QPSK), each pulse has one of four phases, with each phase being separated by 90°. The four states can be described, for example, as 0°, 90°, 180°, and 270°, or as 45°, 135°, 215°, and 285°.

Polarization shift keying (PolSk) can also be used to encode information upon optical signals. An external modulator, preferably formed of lithium niobate, is used to rotate the polarization of pulses depending on the logic value to be encoded. Thus, in a PolSK signal, logic values of 1 are encoded by pulses having a first polarization and logic values of 0 are encoded by pulses having a second, relatively different polarization.

Returning to FIG. 1, receiver 41 of system 25 recovers data from the information carrying optical pulse streams. The recovered information is preferably expressed as an electrical signal. To recover information from a particular optical pulse stream, receiver 41 operates to perform an AND operation between the optical pulse stream and a second optical pulse stream, which is preferably the framing pulse stream. In performing the AND operation, the information-carrying optical pulse stream is simultaneously demodulated to obtain the information carried thereby. Thus, the receiver of the present invention does not require a separate device to demodulate information from the optical pulse stream. Preferably, the AND operation and demodulation are performed simultaneously by coherent detection.

The receiver of the current invention is configured to receive optical time division multiplexed (OTDM) signals. The OTDM signal preferably includes at least one optical pulse stream, which operates as a framing pulse stream. The framing pulses preferably have an optical property, such as an amplitude, phase, or polarization, that allows the framing pulses to be distinguished or isolated from the other pulses. For example, in one embodiment, the amplitude of the framing pulses exceeds that of the other optical pulses by an amount sufficient to allow the framing pulses to be distinguished by performing a threshold operation. The framing pulses are preferably unmodulated.

Figure 3:
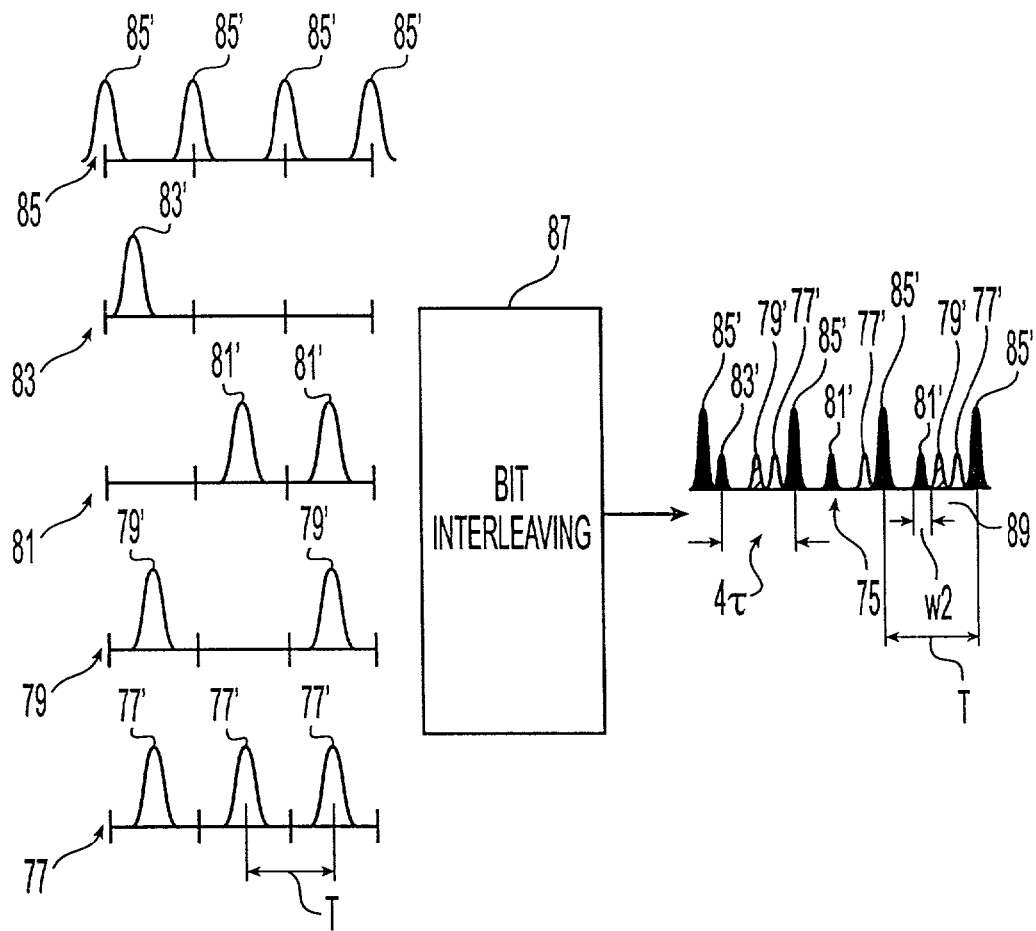
FIG. 3 illustrates the operation of a bit interleaving time division multiplexer.

Referring to FIG. 3, a bit interleaving operation 87 is shown. An exemplary bit interleaved optical signal 75 is formed by combining N=4 optical pulse streams 77, 79, 81, and 83, which include optical pulses 77', 79', 81', and 83', respectively. Typically, N is much greater than 4, such as about 16, 20, or even more. Prior to interleaving, the optical pulse streams are preferably modulated, such as by modulators 31, to carry information. The optical signal 75 also includes a periodic optical pulse stream 85 formed of optical pulses 85', which serves as a framing pulse channel. In one embodiment, the amplitude of pulses 85' exceeds that of the other optical pulses by an amount sufficient to allow pulses 85' to be distinguished from pulses 77', 79', 81', and 83' by performing a threshold operation, as discussed below. In optical signal 75, pulses 85' are spaced apart by a period T. As discussed above, period T greatly exceeds a width w2 of pulses in optical signal 75.

To allow framing pulse stream 85 and optical pulse streams 77, 79, 81, and 83 to be combined without overlapping, transmitter 26 includes a plurality of delay elements 39, 39' which impart a relative delay of iτ to the ith optical pulse stream, where τ, the bit period, is given by T/(N+1). For example, pulses 83' of optical signal 83 are delayed by a time 4τ relative to framing pulses 85' while pulses of adjacent optical pulse streams 79 and 81 are offset from one another by 1τ. Each delay element preferably comprises a different length of optical fiber. Typically, one meter of optical fiber provides a delay of about 5 ns. Preferably framing pulse stream 85 is not delayed relative to the information carrying pulse streams.

Figure 4A:
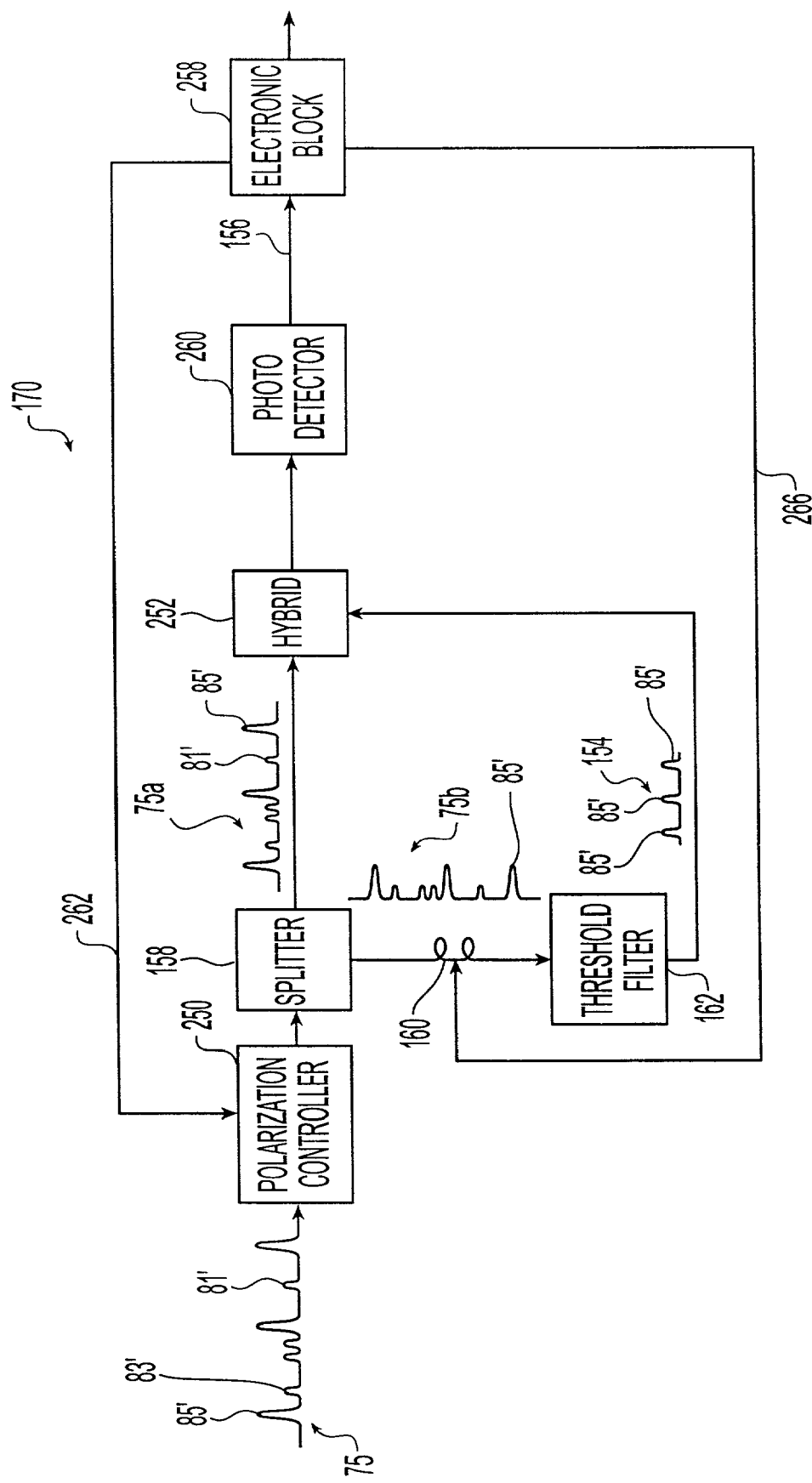
FIG. 4a illustrates an embodiment of a receiver according to the present invention.
Figure 4B:
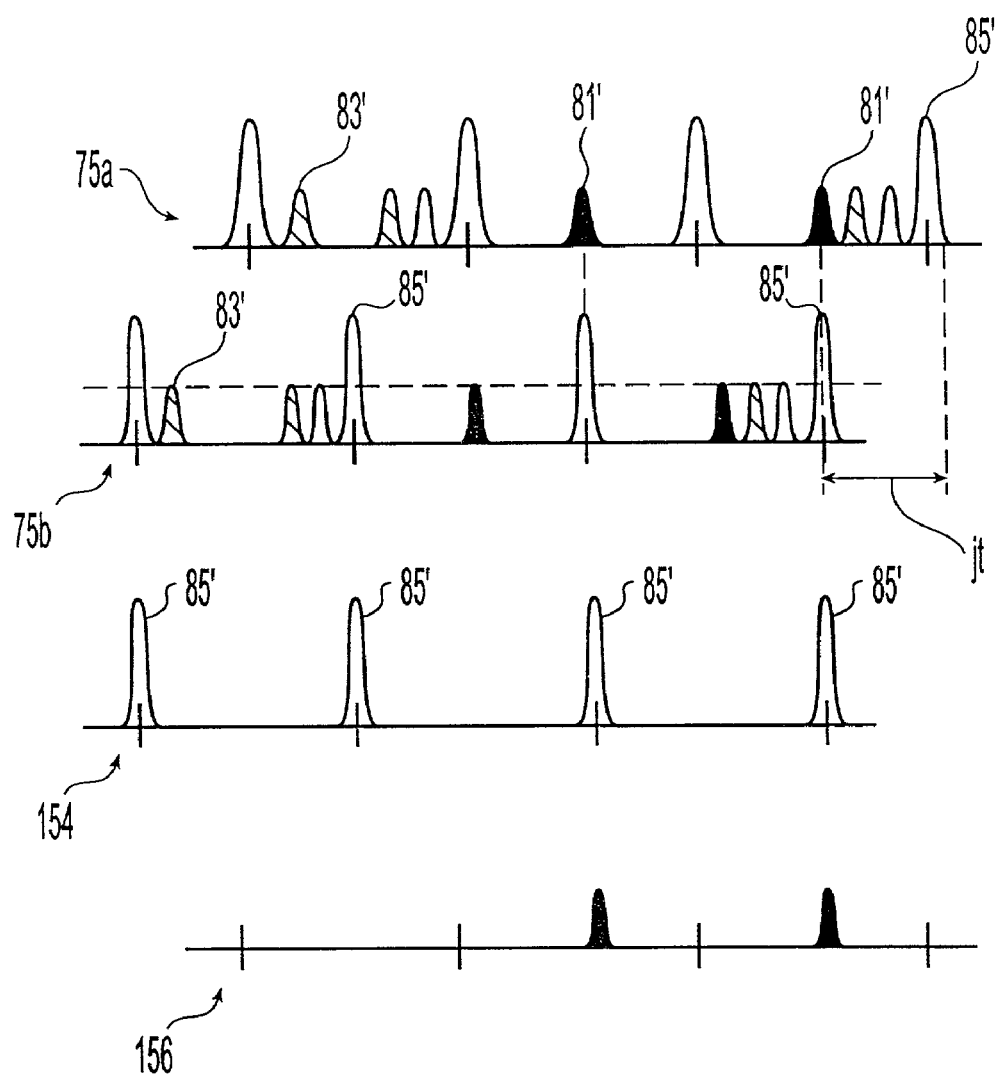

Referring to FIGS. 4a and 4b, a receiver 170 is configured to recover information from a bit-interleaved OTDM stream, such as optical signal 75. Receiver 170 preferably includes a polarization controller 250, which accepts optical signal 75 and outputs a linearly polarized optical signal, which is split by a splitter 158 into first and second channels carrying first and second optical signals 75a, 75b, respectively. To recover information from a particular pulse stream of optical signal 75a, this signal is recombined with at least a portion of optical signal 75b. The recombined signals are delayed relative to one another so that the portion of optical signal 75b is synchronized with the optical pulse stream of optical signal 75b.

A delay element 160 delays optical signal 75b relative to optical signal 75a by a time sufficient to synchronize the framing pulses 85' of optical signal 75b with the bit periods of one of the optical pulse streams of optical signal 75a. In FIG. 4b, for example, optical signal 75b is shown as being delayed such that framing pulses 85' are synchronized with pulses 81' of optical stream 75a. The delay of channel 75b is preferably imparted by a delay element 160, such as by a length of optical fiber. Depending upon which of the N optical pulse streams is to be demodulated, a different length of optical fiber is chosen. In general, if information from the jth optical pulse stream of optical signal 75 is to be recovered, channel 75b is delayed by a time jτ relative to channel 75a. It should be understood, of course, that the delay is relative between the channels. Thus, in an alternative embodiment, channel 75a is delayed relative to channel 75b.

Referring to FIGS. 5a and 5b, delay element 160 can include a tuneable delay element 200 that provides a tuneable delay. Tuneable delay element 200 allows the synchronization of any two pulse streams such as first and second pulse streams 202, 204. In FIG. 5a, pulse stream 202 is ahead of pulse stream 204 by a time ΔT. Thus, to achieve synchronization, stream 202 must be delayed by ΔT relative to stream 204.

Tuneable delay element 200 allows a pulse stream to be delayed by any amount from 0 to $T-2^{-k}$, in steps of $2^{-k}$, where T is the pulse period. Delay element 200 includes k−1 fixed delays, such as optical fiber lengths 206. The fixed delays preferably have values of $T/2, T/4, \ldots, T/2^{k-1}$. Fiber lengths 206 are interconnected by k 2×2 optical switches 207. Each switch 207 includes a control input 208 to allow the output of each switch to be selectively switched between the subsequent fiber length 206 or a fiber 210, which imparts essentially no delay to the pulse stream. Thus, pulse streams 202, 204 can be synchronized by passing pulse stream 204 through a tuneable delay element configured to impart a relative delay of ΔT to pulse stream 204.

Using tuneable delay line 200, two pulse streams can be synchronized to within a time interval of $T/2^k$. Synchronization time interval $T/2^k$ is substantially less than the width of pulses received by receiver 170. By substantially less it is meant that synchronization time interval $T/2^k$ is less than 15% and preferably less than 5% of the width of pulses in the synchronized pulse streams. For example, given a pulse period T of 100 ps and a pulse width of 1 ps, a tuneable filter with k=10 provides a resolution of 100 ps/1024=0.097 ps or less than 10% of the pulse width. Optical pulse streams can also be synchronized by passing one of the pulse streams through a variable air gap delay.

Returning to FIG. 4a, receiver 170 preferably includes a threshold filter 162, which accepts optical signal 75b and outputs an optical pulse stream 154, which is essentially free of pulses other than framing pulses 85'. By essentially free, it is meant that light intensity present within non-framing pulse bit periods of optical signal 154 is insufficient to increase the bit error rate of the information that is recovered from optical signal 75a. The threshold operation can be performed before or after imparting the relative delay to channels 75a and 75b.

Threshold filter 162 has a response time that is shorter than the bit period of optical signal 75b. Thus, upon passing a framing pulse, threshold filter 162 changes state sufficiently rapidly to prevent a following non-framing pulse from passing through the threshold filter. One type of error avoided by virtue of pulse stream 154 being essentially free of intensity at non-framing pulse bit periods is the reduction of spurious output signals that do not correspond to logical values of the pulse stream to be demodulated.

Pulse stream 154 is coherently mixed with optical pulse stream 75a by an optical hybrid 252. The mixed output from optical hybrid 252 impinges upon a photodetector 260, which includes at least one photodiode. In a preferred embodiment, photodetector 260 includes at two photodiodes, which receive a respective output of hybrid 252. The output of photodetector 260 is a time varying current 156. Current 156 includes temporal features that correspond to the logic values of the data stream used to modulate pulse stream 81. Current 156 is preferably in the baseband such that further demodulation is not required to recover the information that was present in the jth pulse stream of channel 152.

The amplitude of pulses 85' of pulse stream 154 is preferably larger than the pulses of optical pulse stream 75a to be demodulated, so that the dominant noise in the receiver is due to quantum noise. An optional amplifier, preferably positioned prior to hybrid 252, can be used to increase the amplitude of the pulses 85' prior to detection.

An electronic block 258 receives the photodiode output. A first feedback output 262 of electronic block 258 is input to polarization controller 250. If delay element 160 comprises a tuneable delay, a second feedback output 266 is sent to control the amount of delay imparted by the delay element to maintain the framing pulse stream 154 in synchronization with the pulse stream to be demodulated.

Figure 6:
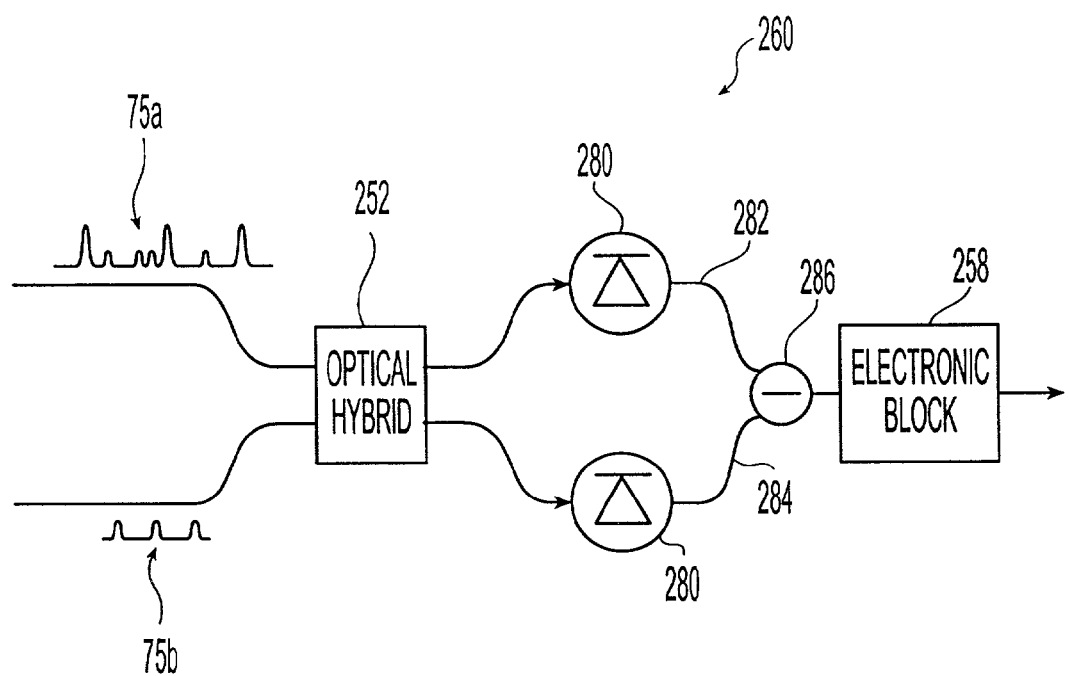
FIG. 6 shows a balanced photoreceiver according to the invention.

As shown in FIG. 6, photodetector 260 is a balanced receiver. Optical signal 75a and framing pulse stream 154 are input to hybrid 252. The two outputs of optical hybrid 252 are converted into first and second electrical signals (currents) 282, 284 using two, preferably matched, photodiodes 280. Electrical signals 282, 284 are operated on by combiner 286, which takes the difference between the two signals. The output of combiner 286 is received by electronic block 258, as discussed above. An example of a balanced photoreceiver suitable for use with the present invention is the model DSC R405 balanced photoreceiver available from Discovery Semiconductors, Inc., Princeton Junction, N.J.

Receiver 170 is preferably configured for coherent detection of OTDM signals as follows. An optical pulse stream containing only a framing pulse stream is transmitted to receiver 170. Splitter 158 splits this framing pulse stream signal into first and second channels, as discussed above. One of the channels is input to delay element 160, which outputs an optical signal delayed relative to the other channel. The delayed optical signal passes through the threshold filter. The delayed optical signal and un-delayed optical signal are mixed at hybrid 252 and impinge upon photodetector 260, as described above. Because the delayed and undelayed optical signals contain only framing pulses, the photodetector 260 will output a non-zero signal only when the two optical signals output by splitter 158 are synchronized. Once the two optical signals output by the splitter 158 are synchronized, information can be recovered from any pulse stream present in an optical signal received by receiver 170 by adjusting the relative delay imparted by delay element 160 to a time jτ, which depends on the particular pulse stream to be demodulated.

Figure 7A:
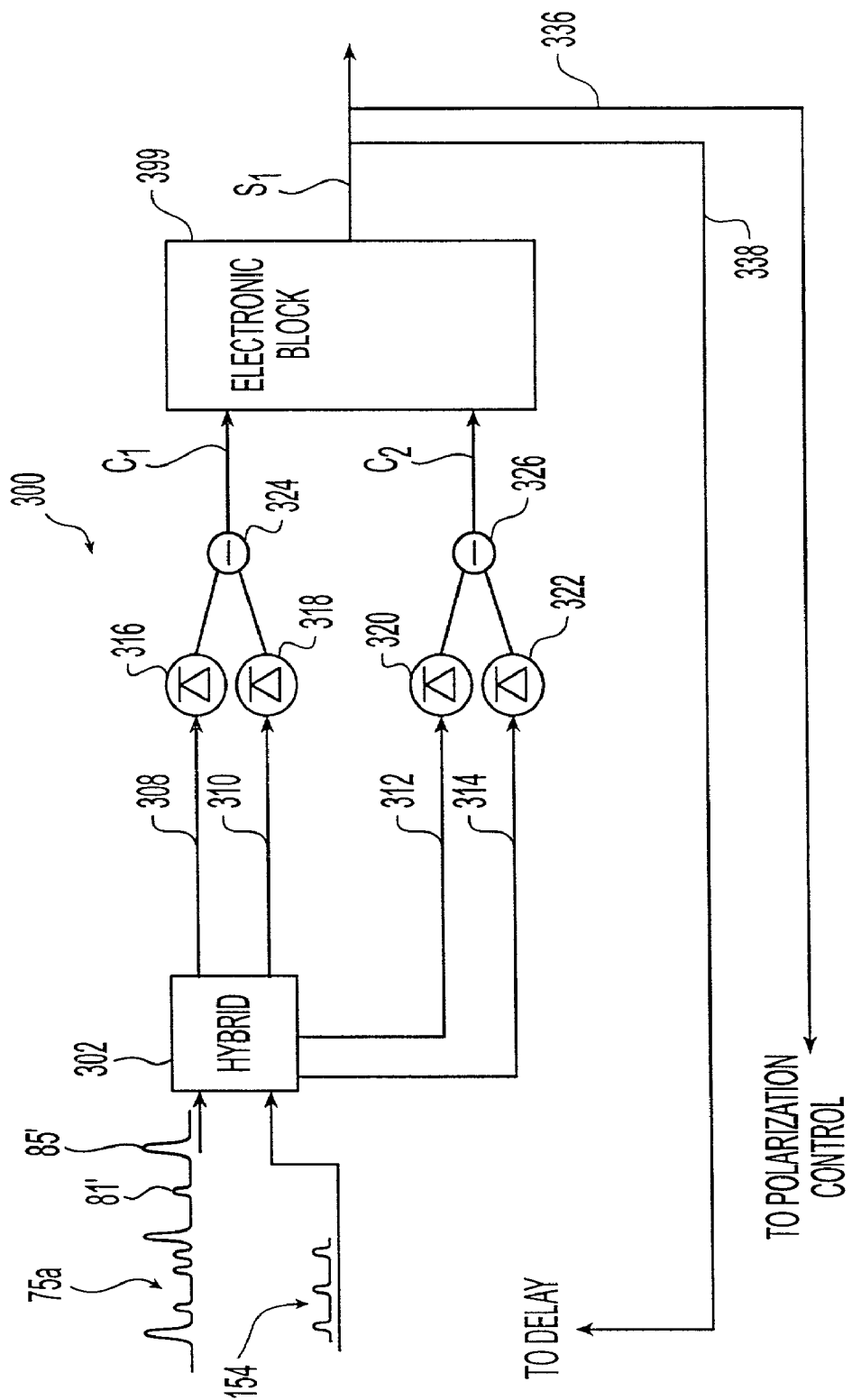
FIG. 7a illustrates a second embodiment of a receiver according to the invention.

Referring to FIG. 7a, a second embodiment of a photodetector 300 is shown. In this embodiment, the receiver is a phase-diversity receiver. A 90° optical hybrid 302, accepts optical signal 75a and framing pulse stream 154, both of which are formed from optical signal 75 as described above in relation to receiver 170. Hybrid 302 coherently mixes optical signal 75a and framing pulse stream 154 forming 4 output pulse streams 308, 310, 312, 314. First and second output pulse streams 308, 310 have a phase state of 0 and 180, respectively. Third and fourth output pulse streams 312, 314 have a phase state of 90 and 270, respectively. The four outputs 308, 310, 312, and 314 impinge upon respective photodetectors, such as photodiodes 316, 318, 320, 322, which produce an electrical signal as described above. Combiner 324 takes the difference between the outputs of photodiodes 316, 318 to produce an output current $C_1$ and combiner 326 takes the difference between the outputs of photodiodes 320, 322 to produce an output current $C_2$. The output currents $C_1$, $C_2$ are input to an electronic block 399 for processing. The processing functions depend upon the type of modulation scheme and whether analog or digital processing is used.

Figure 7B:
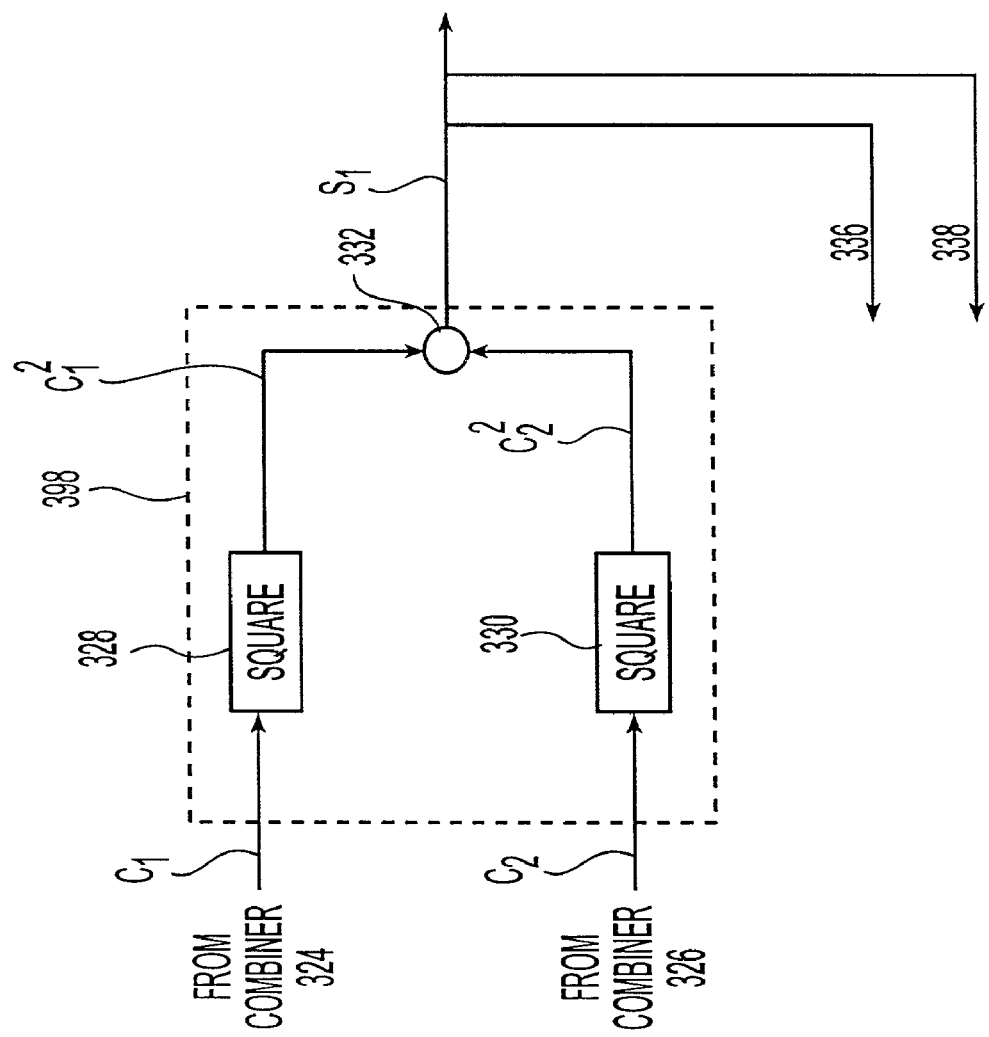

Referring to FIG. 7b, components of electronic block 399 are shown. The output currents $C_1$, $C_2$ are respectively squared 328, 330 to provide squared currents $C_1^2$, $C_2^2$, respectively, and the squared currents summed 332 to form the final output signal $S_1$. The output of photodetector 300 includes feedback loops 336, 338, which are used to control the polarization control, and tuneable delay, if present, as discussed above.

The operation of receiver 300 and electronic block 399 can be expressed mathematically. The four outputs 308, 310, 312, and 314 of the hybrid are given by:

$$E_1(t) = \frac{1}{\sqrt{2}}\{E_S(t)\exp(i\varphi_S(t)) + jE_L(t)\exp(i\varphi_L(t))\} \quad (1)$$

$$E_2(t) = \frac{1}{\sqrt{2}}\{E_S(t)\exp(i\varphi_S(t)) - jE_L(t)\exp(i\varphi_L(t))\} \quad (2)$$

$$E_3(t) = \frac{1}{\sqrt{2}}\{E_S(t)\exp(i\varphi_S(t)) - E_L(t)\exp(i\varphi_L(t))\} \quad (3)$$

$$E_4(t) = \frac{1}{\sqrt{2}}\{E_S(t)\exp(i\varphi_S(t)) + E_L(t)\exp(i\varphi_L(t))\} \quad (4)$$

where the input signal to be demodulated is $E_S$, the local oscillator signal is $E_L$. Signals $E_S$ and $E_L$ have respective phases $\phi_S$ and $\phi_L$. Signals $E_1(t)$, $E_2(t)$, $E_3(t)$, and $E_4(t)$ correspond to optical pulse streams 308, 310, 312, and 314.

The corresponding current signals, $P_1(t)$, output by photodiodes 316, 318, 320, and 322 are proportional to the square of light signals $E_1(t)$, $E_2(t)$, $E_3(t)$, and $E_4(t)$:

$$P_1(t) = \frac{1}{2}\int_0^{\Delta T}[E_S^2(t) + E_L^2(t) + 2E_SE_L\sin(\Delta\varphi(t))]dt \quad (5)$$

$$P_2(t) = \frac{1}{2}\int_0^{\Delta T}[E_S^2(t) + E_L^2(t) - 2E_SE_L\sin(\Delta\varphi(t))]dt \quad (6)$$

$$P_3(t) = \frac{1}{2}\int_0^{\Delta T}[E_S^2(t) + E_L^2(t) + 2E_SE_L\cos(\Delta\varphi(t))]dt \quad (7)$$

$$P_4(t) = \frac{1}{2}\int_0^{\Delta T}[E_S^2(t) + E_L^2(t) - 2E_SE_L\cos(\Delta\varphi(t))]dt \quad (8)$$

Combiner 324 subtracts $P_1$ from $P_2$ to produce output current $C_1$:

$$C_1 = E_S E_L \sin(\Delta\phi) \quad (9)$$

Combiner 326 subtracts $P_3$ from $P_4$ to produce output current $C_2$:

$$C_2 = E_S E_L \cos(\Delta\phi) \quad (10)$$

The treatment of output currents $C_1$, $C_2$ depends upon the technique that was used to modulate the optical signals at the transmitter. As shown in FIG. 7b for ASK modulated optical signals, the signal is squared 328, 330 and the squared signals $C_1^2$, $C_2^2$ are summed 332 to yield output signal $S_1$:

$$S_1 = 2E_S^2 E_L^2 \quad (11)$$

The sum is equal to 1 when a logic value of 1 is received and is equal to 0 when a logic value of 0 is received.

Figure 7C:
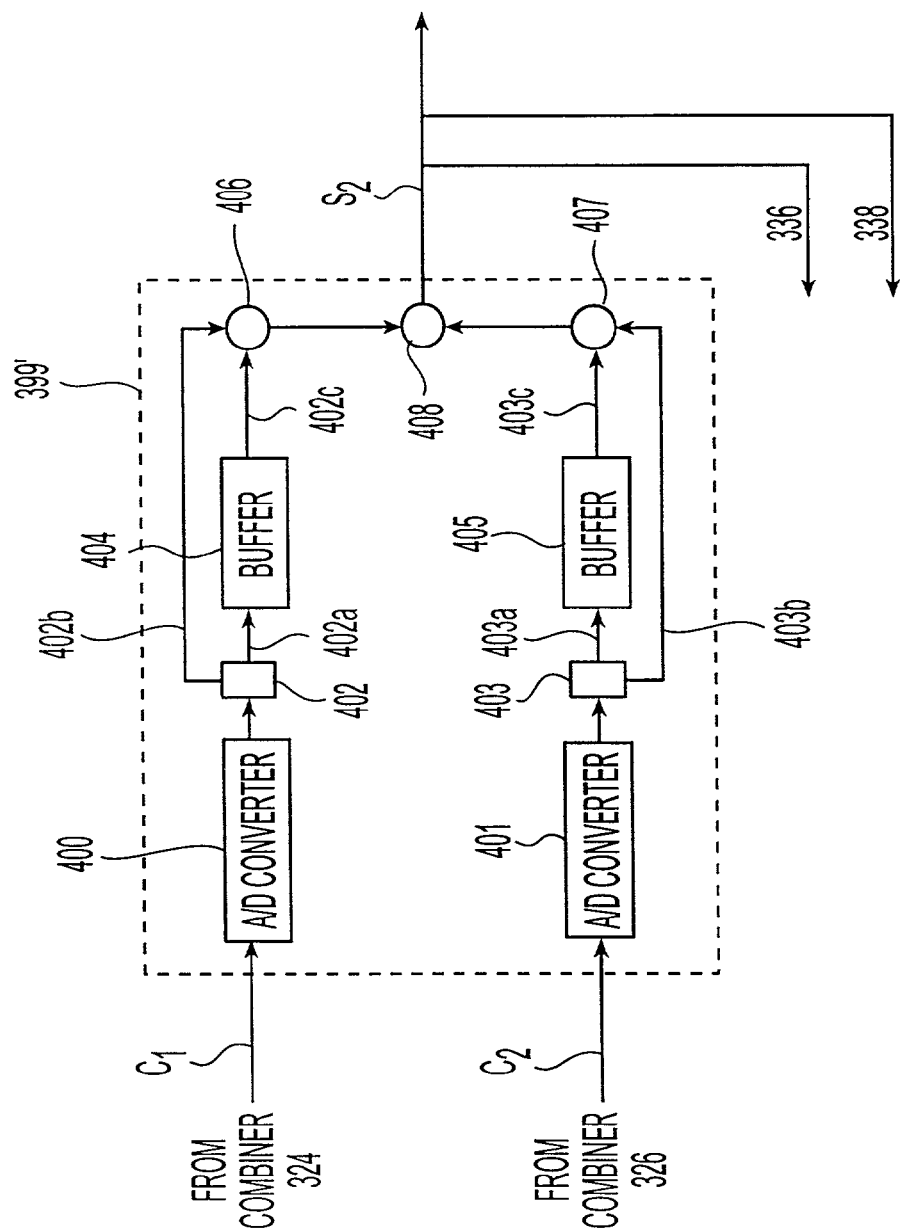

Referring to FIG. 7c, an embodiment of an electronic block 399', which can be substituted for electronic block 399, is shown. Electronic block 399' is preferably used where information is to be recovered from DPSK modulated optical pulse streams. Currents $C_1$, $C_2$ are converted to digital signals by respective high speed analog to digital (A/D) converters 400, 401. The CompuScope 82G PC card available from Gage Applied Science, Inc, Montreal, Canada provides a suitable A/D converter.

Signals output by A/D converters 400, 401 are split 402, 403 into pairs of channels 402a, 402b and 403a, 403b. A buffer 404 accepts channel 402a and produces a delayed output 402c. A combiner 406 outputs the product of channels 402b and 402c. A combiner 407 operates similarly to output the product of channel 403b and a delayed channel 403c output by a buffer 405. The outputs of combiners 406, 407 are subtracted 408 to produce an output $S_2$.

As an example of the comparison process, assume that the values of $<C'_1>$ and $<C'_2>$ for the next pulse are given by:

$$C'_1 = E_S E_L \sin(\Delta\delta) \quad (12)$$

$$C'_2 = E_S E_L \cos(\Delta\delta) \quad (13)$$

where $\Delta\delta$ is the relative phase difference. The output of combiner 408 is given by:

$$S_2 = C_1 \cdot C'_1 - C_2 \cdot C'_2 \quad (14)$$

The differential phase signal $S_2$ can be expressed as:

$$S_2 = E_S E_L(\cos(\Delta\phi)\cdot\cos(\Delta\delta) + \sin(\Delta\phi)\cdot\sin(\Delta\delta)) = E_S E_L \cos(\Delta\phi - \Delta\delta) \quad (15)$$

For BPSK (binary phase shift keying) the unchanged phase corresponds to the signal 1, and the change of phase will appear as (−1).

For QPSK (quadratic shift keying) modulation the signal processing consists in obtaining two signals:

$$<C_1>\cdot<C'_1> + <C_2>\cdot<C'_2> = E_S E_L \cos(\Delta\phi - \Delta\theta)$$

$$<C_1>\cdot<C'_2> - <C_2>\cdot<C'_1> = E_S E_L \sin(\Delta\phi - \Delta\theta) \quad (16)$$

The combination of values of these two signals (11, 1−1, −11, −1−1) allows to perform the unique decoding of the phase change.

Figure 8A:
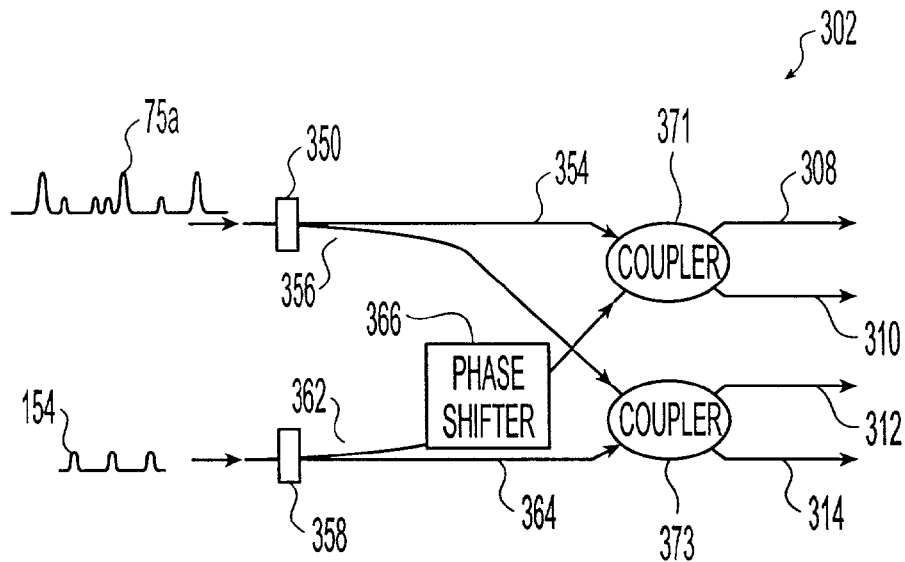
FIGS. 8a and 8b illustrate optical hybrids according to the invention.

One embodiment of a hybrid 302 is shown in FIG. 8a. A splitter 350 splits pulse stream 75a to be demodulated into first and second channels 354, 356. A second splitter 358 splits framing pulse stream 154 into third and fourth channels 362, 364. A phase shifter 366 introduces a phase shift into one of the channels output by one of splitters 350, 358, such as channel 362. Channels 354 and 362 are combined by a first 3 dB coupler 371 to form output pulse streams 308 and 310. Channels 356 and 364 are combined by a second 3 dB coupler 373 to form output pulse streams 312 and 314. The outputs of the couplers are detected by photodiodes 316, 318, 320, 322, as described above.

Figure 8B:
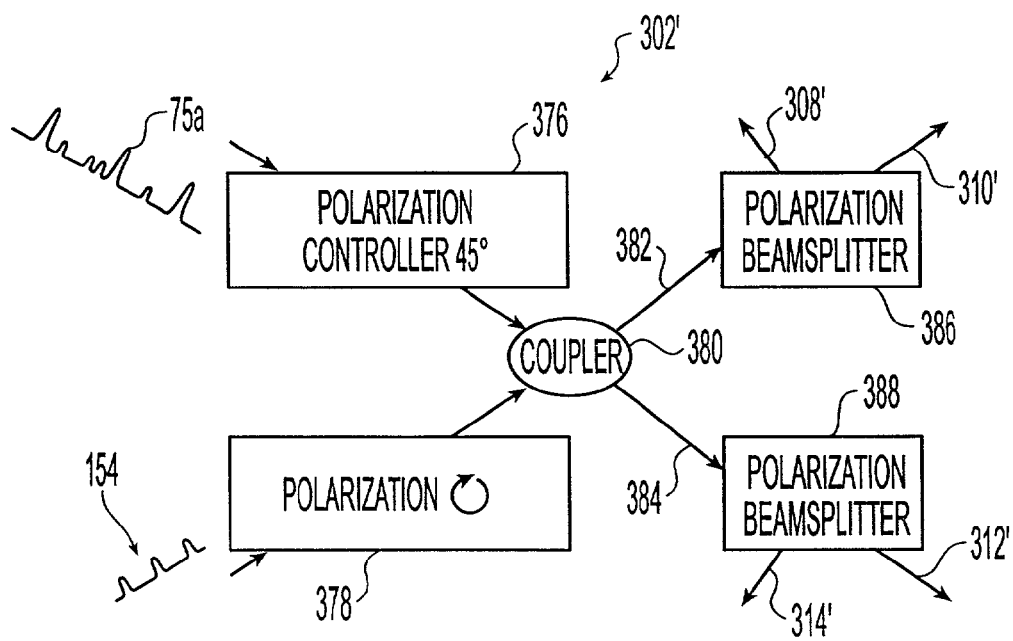

A second embodiment of a hybrid 302' is shown in FIG. 8b. Optical signal 75a and pulse stream 154 are acted upon by first and second polarization controllers 376 and 378, respectively. One of the polarization controllers forms the 45° state of the signal it receives and the other forms the circularly polarized state of the received signal. In FIG. 8, controller 378 is shown as forming the circularly polarized state of pulse stream 154. The outputs of controllers 376 and 378 are combined by a 3 dB coupler 380, which produces first and second output pulse streams 382 and 384. Output pulse stream 382 is received by a polarization beam (PB) splitter 386, which produces outputs 308' and 310'. Output pulse stream 384 is received by a polarization beam splitter 388, which produces outputs 312' and 314'. The outputs 308', 310', 312', 314' are detected by photodiodes 316, 318, 320, 322, as described above for outputs 308, 310, 312, 314.

Figure 9:
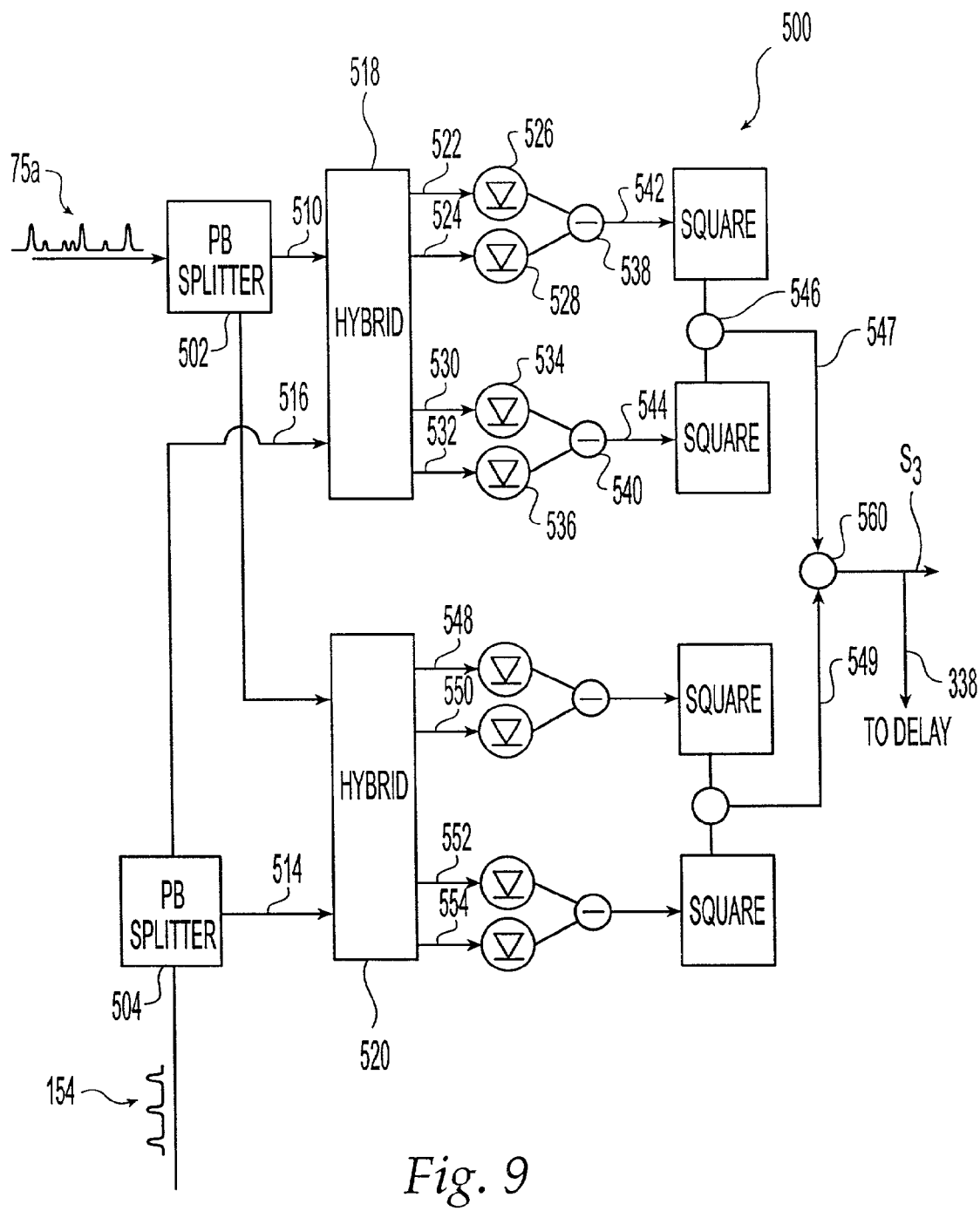
FIG. 9 shows a polarization diversity receiver according to the invention.

Referring to FIG. 9, another embodiment of the receiver of the present invention is a polarization diversity receiver 500, which is configured to separately detect components of the received optical signal that have different linear polarizations. Receiver 500 includes first and second polarization splitters 502 and 504. Splitter 502 splits optical signal 75*a* into a first channel 510, having a first polarization, and a second channel, 512 having a second, different polarization. Preferably, the two polarizations are orthogonal to one another. Second splitter 504 splits optical pulse stream 154 into a third channel 514, having the first polarization, and a fourth channel, 516 having the second, different polarization.

Channels 510 and 516 having the same polarization state are received and coherently mixed by an optical hybrid 518. Channels 512 and 514 having the same polarization state are received and combined by an optical hybrid 520. Optical hybrids 518 and 520 operate in a similar manner to optical hybrid 302, discussed above. Thus, for example, optical hybrid 518 outputs optical pulse streams 522, 524, 530, and 532, which have phase states of 0, 180, 90, and 270, respectively. The outputs of hybrids 518, 520 impinge upon respective photodetectors, such as photodiodes 526, 528, 534, 536, which produce an electrical signal as described above.

Combiner 538 takes the difference between the outputs of photodiodes 526 and 528 and combiner 540 takes the difference between the outputs of photodiodes 534 and 536. The subtraction operation cancels any errors that would otherwise be introduced by a change in the phase of signal 506 with respect to the phase of the local oscillator output. A combiner 538 takes the difference between the outputs of diodes 526 and 528 to produce an output 542 and a combiner 540 takes the difference between the outputs of diodes 534 and 536 to produce an output 544. For ASK modulated signals, outputs 542 and 544 are squared and summed to produce a first summed output 547. Optical hybrid 520 outputs optical pulse streams 548, 550, 552, and 554, which are received and processed similarly to the outputs of hybrid 518 to produce a second summed output 549. Summed outputs 547 and 549 are summed 560 to produce a final signal $S_3$.

The output of photodetector includes a feedback 338, which is used to control tuneable delay, if present, as discussed above. Preferably, a feedback controlled polarization device is not used because the receiver output is independent of fiber induced polarization fluctuations that affect the polarization of optical signal 506.

A preferred optical hybrid can be fabricated as an integrated structure from an optical crystal, such as $LiNbO_3$. For example, Hoffmann et al. Journal of Lightwave Technology, vol. 7, No. 5, May 1989, which is incorporated herein to the extent necessary to understand the present invention, discloses an integrated hybrid having four 3-dB directional couplers and two phase shifters for adjusting the phase relationship of the output signals. The integrated hybrid uses waveguides rather than fiber optics to direct the optic signals. Because the waveguides and associated structures can be fabricated using photolithographic techniques, such integrated hybrids can be produced at lower cost and within higher tolerances with less functional variation than conventionally produced optical hybrids. A preferred coherent photoreceiver includes an integrated hybrid packaged with a balanced detector and amplifiers on a single, compact optical board.

Figure 10:
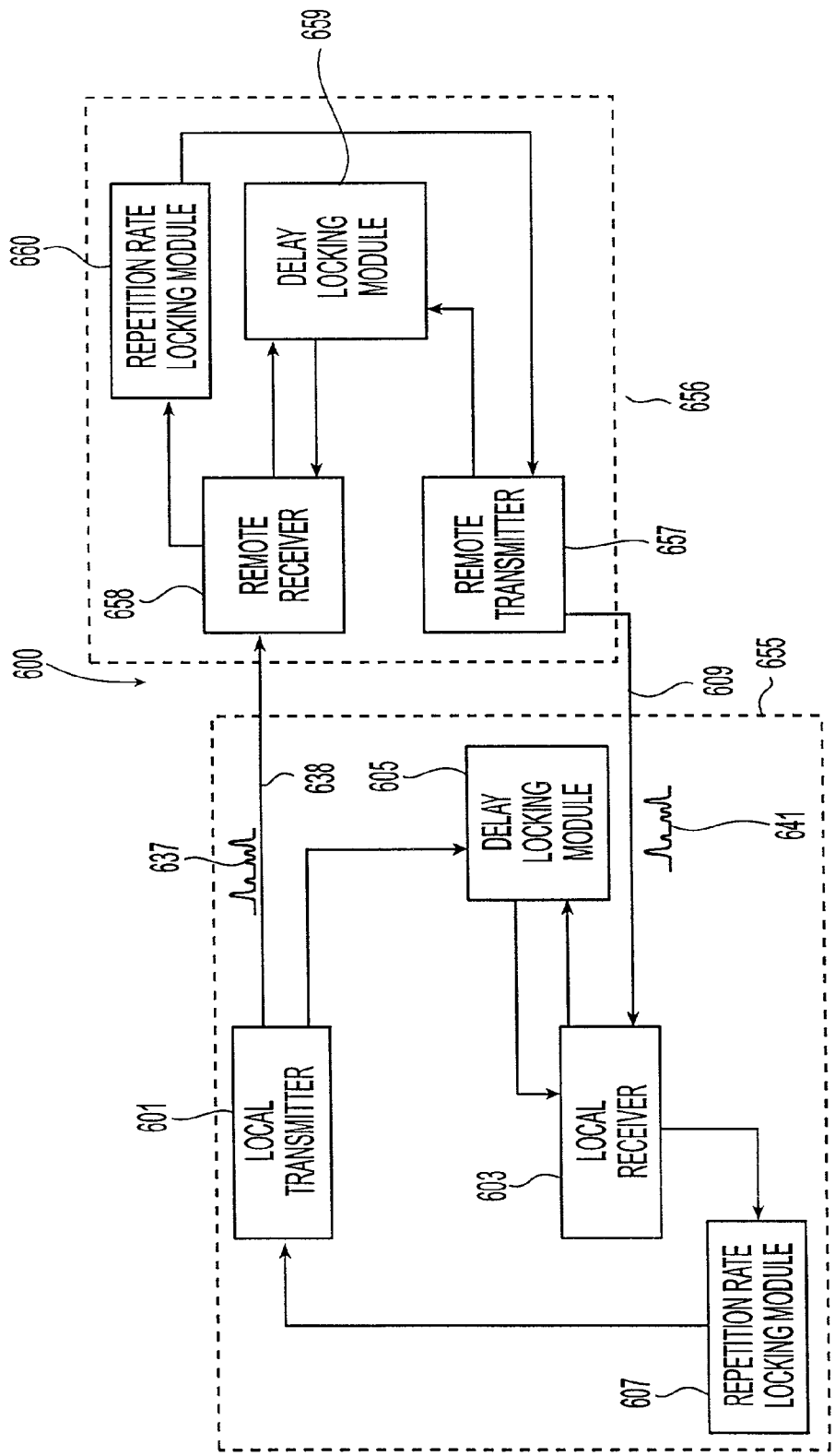
FIG. 10 shows a second embodiment of a system according to the invention.

Referring to FIG. 10, a system 600 includes a local subsystem 655 and a remote subsystem 656. Local subsystem 655 includes a local transmitter 601 and a local receiver 603. As discussed below, local transmitter 601 and local receiver 603 cooperate via a delay locking module 605 and a repetition rate locking module 607 to recover information carried by an interleaved optical signal 641, which is transmitted by a remote transmitter 657 of remote subsystem 656. Local transmitter 601 transmits an interleaved optical signal 637, which is received by a remote receiver 658, which cooperates with remote transmitter 657 via a delay locking module 659 and a repetition rate locking module 660 to recover information carried by optical signal 637. Optical signals 638, 609 are preferably carried by respective optical fibers 638, 609, which form a bidirectional fiber link between local subsystem 655 and remote subsystem 656.

Figure 11A:
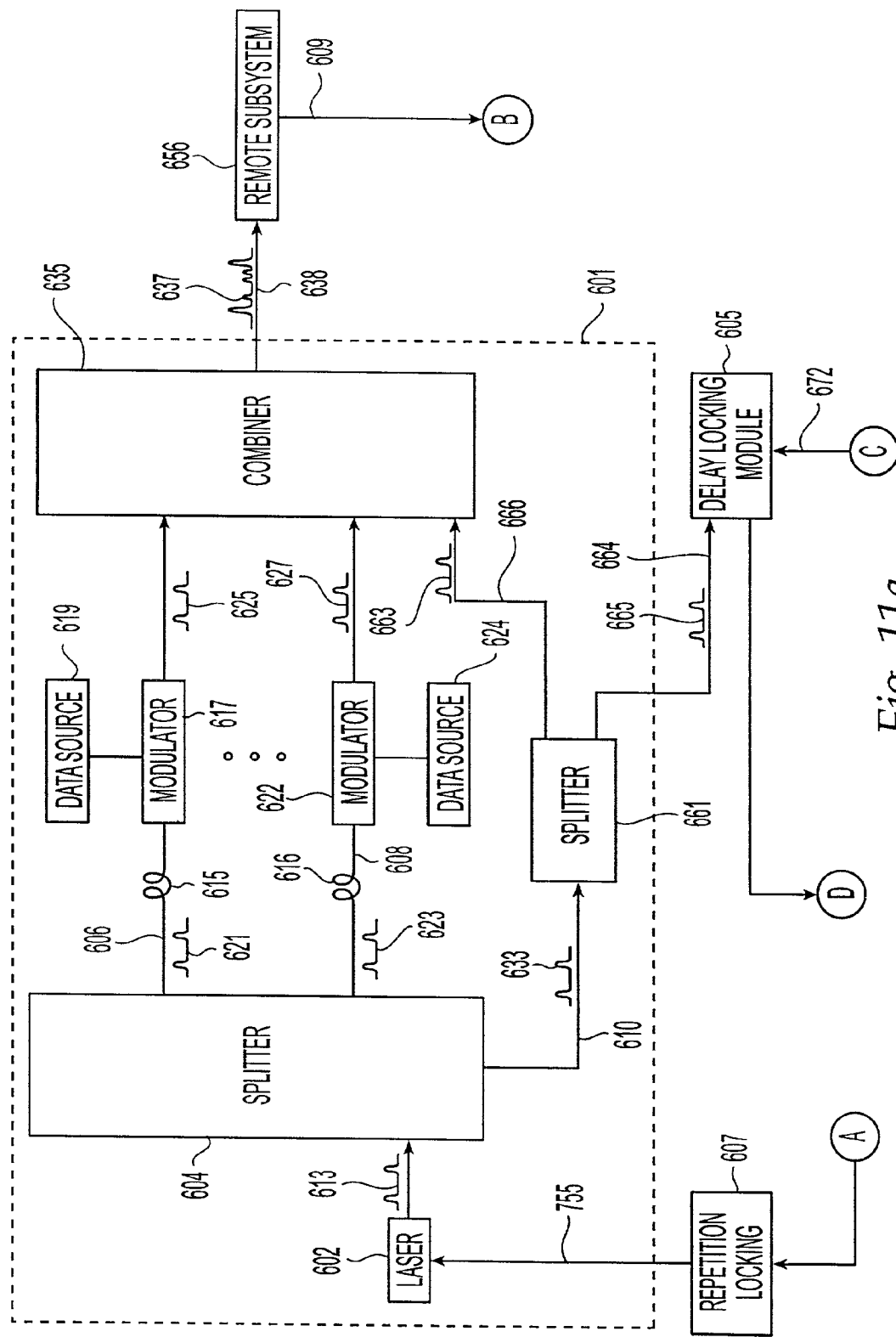
FIGS. 11a and 11b show detail of the system of FIG. 10.
Figure 11B:
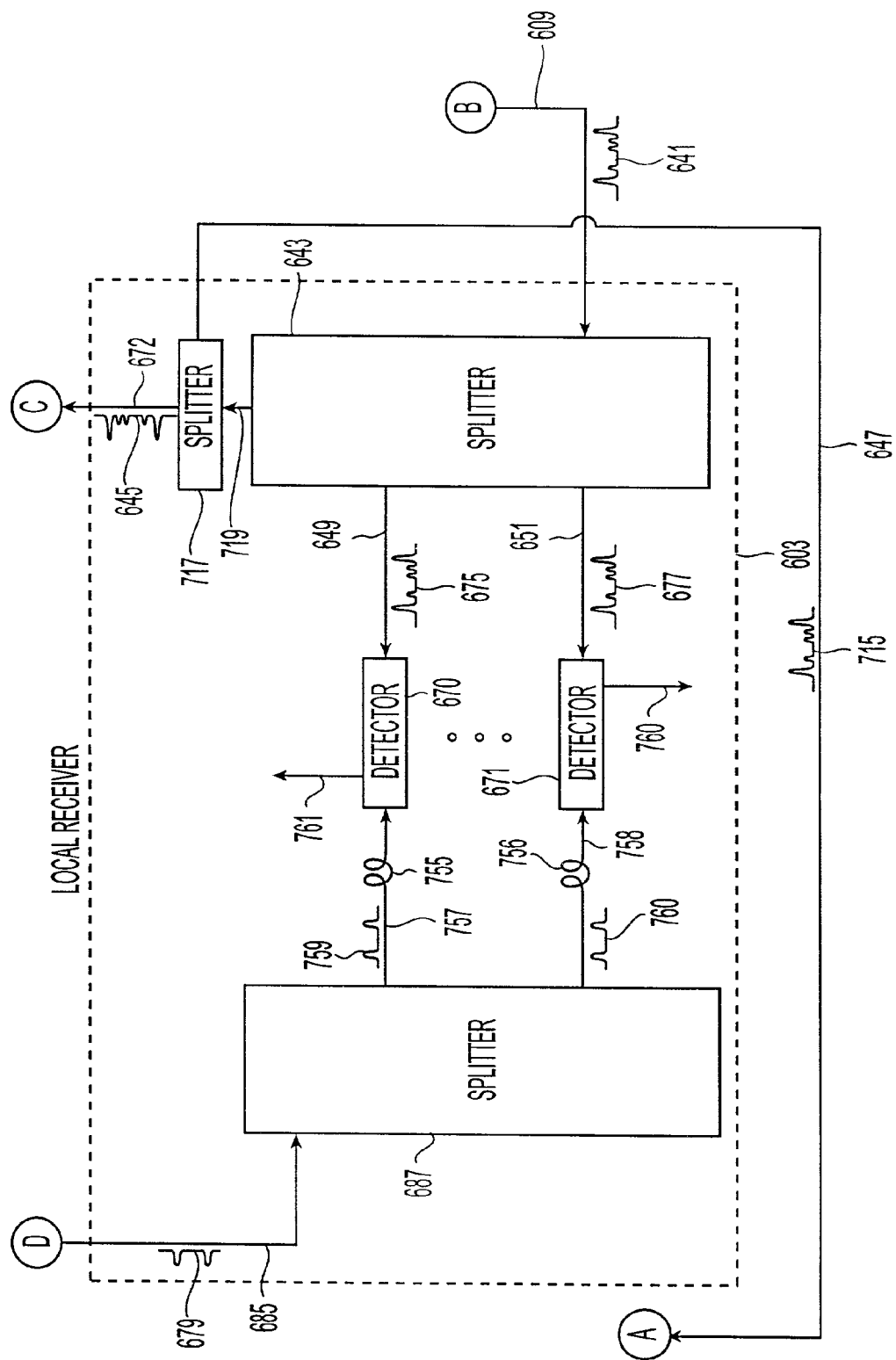

Referring to FIGS. 11*a*, 11*b*, the operation of the local subsystems are discussed with reference to local subsystem 655. Local transmitter 601 operates to transmit interleaved optical signal 637. A light source, which is preferably a laser 602, such as a mode-locked fiber or semiconductor laser as described above, outputs a periodic pulse stream 613 of optical pulses having a width, shape, and period T identical to the pulse stream output by light source 27. An optical splitter 604 splits pulse train 613 into N+1 channels.

Of the N+1 channels, N channels serve as information carrying channels. As discussed above, a pulse stream can be modulated to carry information provided by a data source by modulating optical properties of the pulses, such as at least one of the amplitude, phase, and polarization. Pulses of optical pulse streams 621, 623 of channels 606, 608 are modulated by respective modulators 617, 622 to represent information provided by data sources 619, 624. Modulator 617 outputs a modulated optical pulse stream 625 and modulator 624 outputs a modulated optical pulse stream 627.

An optical pulse stream 633 of one of the N+1 channels, channel 610, preferably retains substantially the same periodicity, pulse width, and duty cycle of optical pulse stream 613 output by laser 602 to provide a framing pulse stream for use in the data recovery process at both local receiver 603 and remote receiver 658. Thus, channel 610 is split by a splitter 661 into channels 664, 666. As discussed below, pulse stream 663 of channel 666 is interleaved with the modulated pulse streams of the N information carrying channels and transmitted to remote receiver 658. Pulse stream 665 of channel 664 serves as a framing pulse stream used in the data recovery process via delay locking module 605, to be discussed below. As an alternative to using splitter 604 to split pulse stream 613 into N+1 channels and splitter 661 to split one of the resulting channels into 2 channels, a single splitter can be used to split pulse stream 613 into N+2 channels to supply N information carrying channels and 2 channels to be used in the data recovery process.

The N modulated optical pulse streams and optical pulse stream 663 are combined by a combiner 635. Combiner 635 outputs interleaved optical signal 637, which is transmitted into an optical network, such as via an optical fiber 638. To prevent the interleaved optical pulse streams in the optical signal 637 from overlapping, the information-carrying channels are delayed by different amounts relative to framing pulse stream 663. To impart the delays, channels 606, 608 include delay elements 615, 616, respectively. The delay elements can be fixed delay elements, such as lengths of optical fiber matched to the desired delay, as discussed above. The delay elements can also be made tuneable, as discussed above. In either case, delay elements 615, 616 impart a delay of iτ to the optical pulse stream of the ith information carrying channel relative to the pulses of pulse stream 663.

Interleaved optical signal 637 is received by remote receiver 658, which operates to recover information present in the N information-carrying pulse streams. During the data recovery process, optical signal 637 is split into N+1 channels. Data is recovered from N of the channels and 1 of the channels is used as a framing pulse channel to lock the repetition rate of the laser of the remote transmitter 657 to the repetition rate of the pulse streams present in optical signal 637. During data recovery, an output of the locked, remote transmitter is combined with the N information carrying channels. Thus, the data recovery operation, which is the same at each subsystem, involves cooperation between the transmitter and receiver of each subsystem. For clarity, the data recovery operation will be discussed in reference to local receiver 603, which operates to recover information from an interleaved optical signal 641 transmitted by remote transmitter 657. Optical signal 641 has substantially identical optical and temporal properties as optical signal 637 and includes N' information-carrying optical pulse streams, where N' is preferably, but not necessarily, equal to N. Optical signal 641 also includes a framing pulse stream, as described above.

As shown in FIG. 11*b*, optical signal 641 is split by a splitter 643 into N'+1 channels. Information is recovered from N' of the N'+1 channels and 1 of the channels is used in the data recovery process. One of the split channels, channel 719, is further split by a splitter 717 into a channel 647 and a channel 672. An optical pulse stream 645 of channel 672 is used to provide a framing pulse stream, which is synchronized with the framing pulse stream present in optical signal 641. Additionally, an optical pulse stream 715 of channel 647 is used to lock the repetition rate of laser 602 to the repetition rate of the optical pulse streams present in optical signal 641. The synchronization process, which is performed by delay locking module 605, and the repetition locking process, which is performed by repetition rate locking module 607, are discussed below.

Figure 12A:
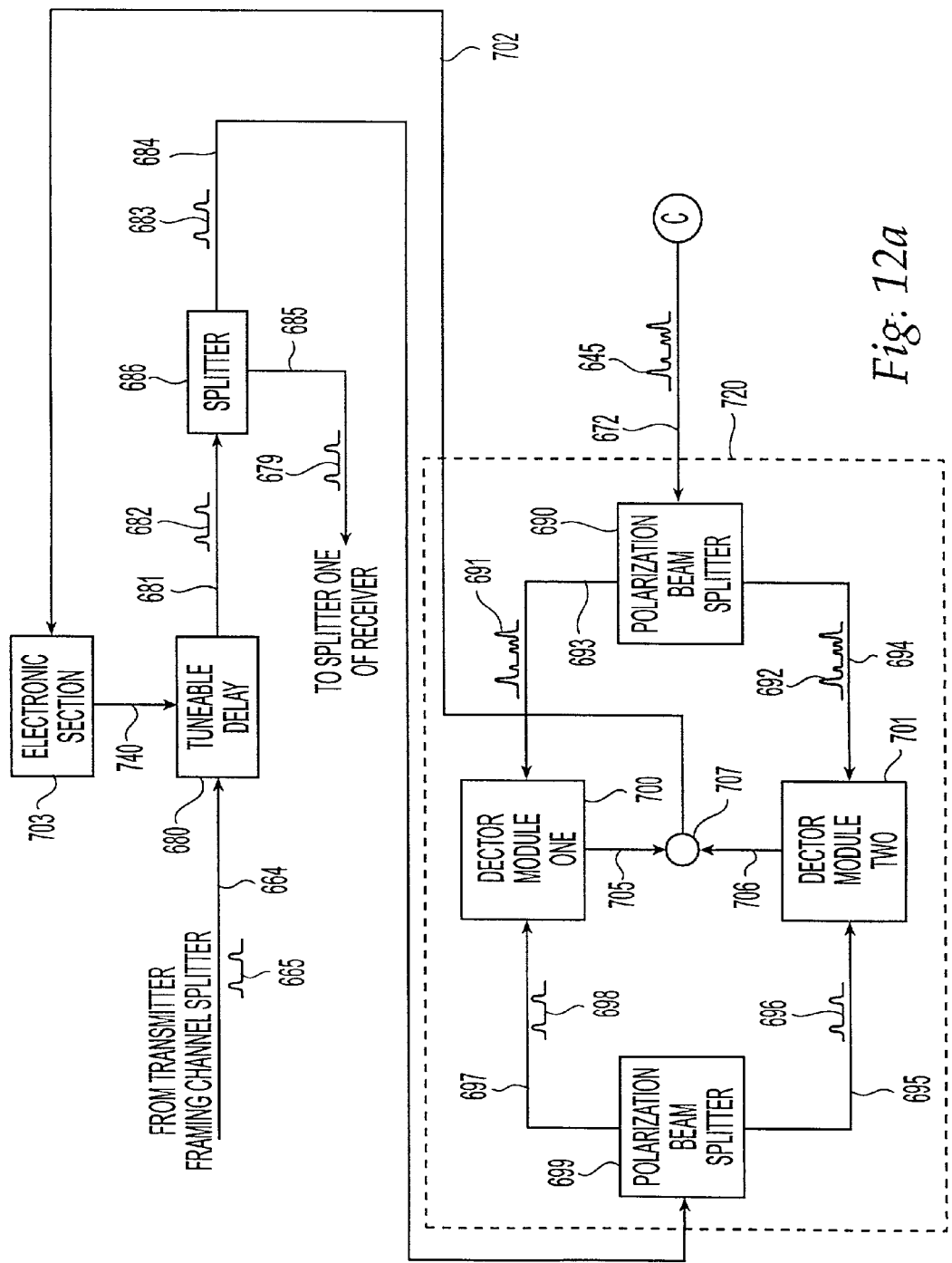
FIG. 12a shows detail of a delay locking module of the system of FIG. 10.
Figure 12B:
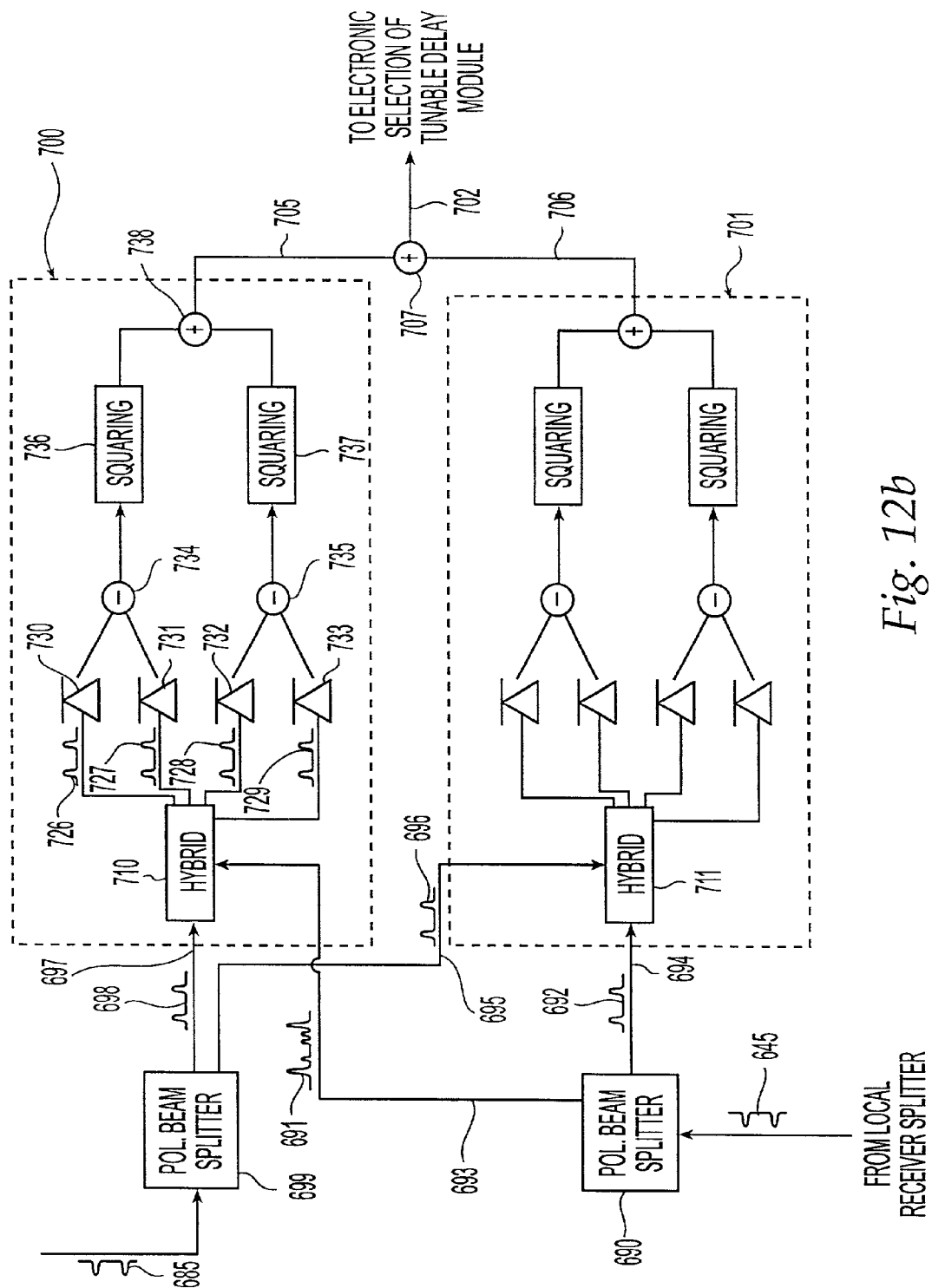

Referring to FIGS. 12*a* and 12*b*, delay locking module 605 outputs a framing pulse stream 679, which has a predetermined offset with respect to information carrying pulse streams to be recovered. Preferably, framing pulse stream 679 is synchronized with the framing pulse stream of optical signal 641 from the remote transmitter. By synchronized, it is meant that the offset between the two pulse streams is less than about 15%, preferably less than about 10%, and most preferably less than about 5% of the widths of pulses in the streams. During information recovery, framing pulse stream 679 and a pulse stream to be recovered are mixed at local receiver 603.

As seen in FIG. 12*a*, pulse stream 665 of channel 664 from local transmitter 601 is input to delay locking module 605. Upon entering delay locking module 605, optical pulse stream 665 passes through a tuneable delay 680. Suitable tuneable delays, such as those comprising a plurality of optical switches or a variable air gap, are discussed above.

A channel 681 carries a variably-delayed optical pulse stream 682 output by tuneable delay 680. An optical splitter 686 splits optical pulse stream 682 into channels 684, 685 carrying optical pulse streams 683, 679, respectively. Optical pulse streams 679, 683 preferably have the substantially the same periodicity, pulse widths, and duty cycle as optical pulse stream 613 output by laser 602. Optical pulse stream 679 is the framing pulse input to local receiver 603, as discussed below.

Optical pulse stream 683 is used to determine the variable delay that synchronizes framing pulse stream 679 with the framing pulse stream of optical signal 641. Optical pulse stream 683 and a pulse stream 645 of channel 672, split from the optical signal 641 received from the remote transmitter, are detected by a detector 720. The detector 720 outputs a signal 702 that is sensitive to the offset between the two pulse streams.

The detector output 702 is input to an electronic section 703, which controls tuneable delay 680. By varying the delay imparted to pulse stream 665 by tuneable delay 680, the framing pulse stream 679, can be continuously synchronized with the framing pulse stream present in optical signal 641.

The operation of detector 720, which is preferably a polarization diversity detector, is explained with reference to FIG. 12*b*. Optical pulse stream 645 is split by a polarization beam splitter 690 into optical pulse streams 691, 692 of channels 693, 694, respectively. Optical pulse streams 691, 692 preferably have the same polarization state. Optical pulse stream 683 is split by a polarization beam splitter 699 into optical pulse streams 696, 698 of respective channels 695, 697. Optical pulse streams 696, 698 preferably have the same polarization state. Optical pulse streams 691, 698 are received by a detector module 700 and optical pulse streams 692, 696 are received by a detector module 701.

Each detector module includes a 90° optical hybrid, which mixes one of the pulse stream output by each polarization beam splitter 690, 699. For example, hybrid 710 mixes pulse streams 698, 691. Optical hybrid 710 forms first and second output pulse streams 726, 727, which have a relative phase state of 0 and 180, respectively. The hybrid 710 also produces third and fourth output pulse streams 728, 729, which have a relative phase state of 90 and 270, respectively. The four outputs 726, 727, 728, 729 impinge upon respective photodetectors, such as photodiodes 730, 731, 732, 733, which produce an electrical signal as described above. Combiner 734 takes the difference between the outputs of photodiodes 730 and 731 and combiner 735 takes the difference between the outputs of photodiodes 732 and 733. The outputs of the combiners 734, 735 are squared 736, 737 and summed 738 to provide an output 705. Detector module 701 operates similarly to produce an output 706 obtained by detecting pulse streams 692, 696.

Outputs 705 and 706 are summed 707 to provide combined output 702, which is maximized when optical signals 683, 645 are aligned. Optical signals 683, 645 are brought into alignment by changing the delay imparted by tuneable delay 680 until output 702 is maximized. This is accomplished by an electronic section 703, which receives output 702 and controls tuneable delay 680 via a delay control output 740.

Figure 13:
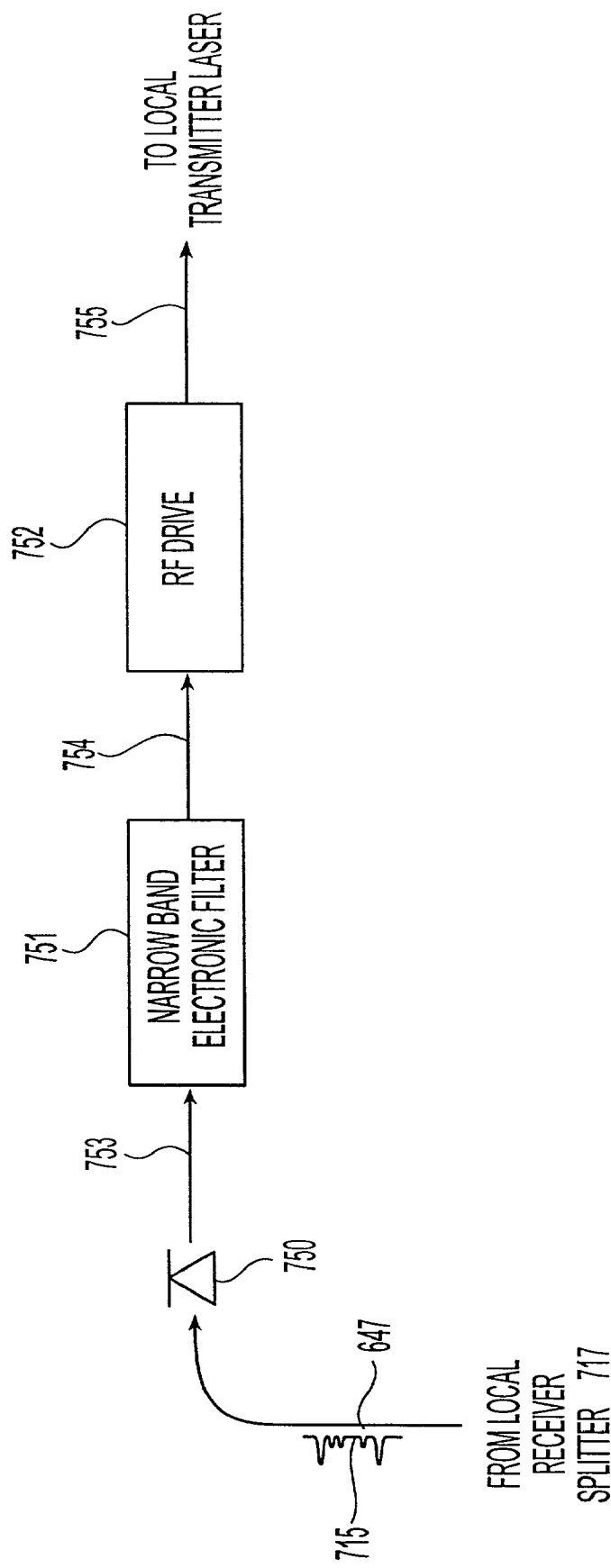
FIG. 13 shows detail of a repetition rate locking module of the system of FIG. 10.

Referring to FIG. 13, the repetition rate of laser 602 is locked to the repetition rate of the framing pulse stream of optical signal 641 by repetition rate module 607. Optical pulse stream 715, which was split from optical signal 641 by splitters 643, 717, is detected by a photodiode 750, which produces an current output 753. A narrow band electronic filter 751 amplifies and filters output 753 to provide a filtered output 754. Filter 751 preferably has a bandpass centered at the expected repetition rate of the framing pulse stream of optical signal 641, which is primarily determined by the repetition rate of the laser of the remote transmitter. The bandpass is sufficiently narrow to reject components of output 753 appearing at frequencies higher and lower than the repetition rate. However, because the repetition rate of the remote laser may drift during operation, the bandpass of filter 751 is preferably sufficiently wide to pass components of output 753 that result from drift. Preferably, the full-width-half-maximum of the filter bandpass is less than about 1 MHz. The filter output 754 is input to a radio frequency drive unit 752, which provides an output 755 that drives laser 602 at the repetition rate of the framing pulse channel of optical signal 641. Thus, optical pulse stream 679, which is output by delay locking module 605 is both synchronized in time with and has the same periodicity as the framing pulse stream of optical signal 641.

Referring back to FIG. 11b, the operation of local receiver 603 is explained. Framing optical pulse stream 679 is split into N channels by a splitter 687 of receiver 603. Each channel output of splitter 687 serves as a channel of framing pulses to allow data to be recovered from a particular information carrying pulse stream of optical signal 641. Data recovery is accomplished using detectors 670, 671. For example, a framing pulse stream 759 of channel 757 and an optical pulse stream 675 are detected by a detector 670, which is preferably a balanced photoreceiver, such as photodetector 260, or a phase diversity detector 300, as discussed above. Detectors 670, 671 provide respective outputs 761, 760, which are representative of the information carried by a particular pulse stream of optical signal 641.

To allow data to be recovered from different pulse streams of optical signal 641, each channel output of splitter 687 includes a delay element to delay the framing pulse stream in that channel by an amount $j\tau$ relative to the channel having the information to be recovered. For example, channel 757 includes a delay element 755, such as a length of fiber, which delays framing pulse stream 759 relative to optical pulse stream 675. Channel 758 includes a delay element 756, which delays framing pulse stream 760 relative to optical pulse stream 677. An advantage of system 600 of FIG. 10 is that a framing pulse channel output by the local light source laser 602 is used to select and demodulate information from incoming optical signals. Because of the higher amplitude available from the locally provided framing pulse channel, the detector operates at or close to the quantum noise limit, which provides the maximum sensitivity to weak incoming optical signals. If necessary to increase the amplitude of the locally provided framing pulse channel, subsystem 655 can be provided with an amplifier, preferably placed prior to delay locking module 605.

Figure 14:
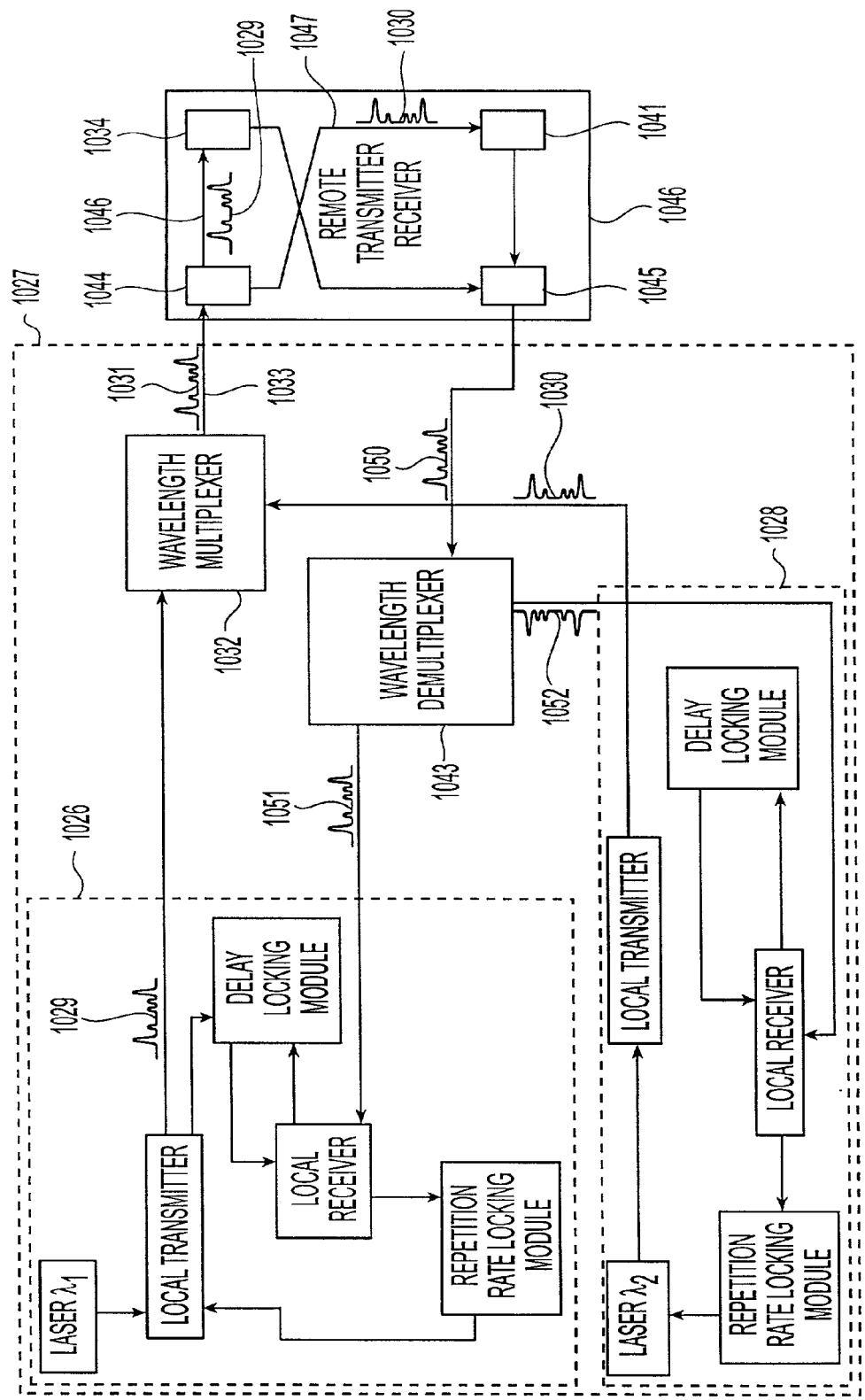
FIG. 14 shows an embodiment of a system for transmitting and receiving combined time division and wavelength multiplexed signals according to the invention.

Referring to FIG. 14, a WDM-OTDM system 1025 utilizes wavelength division multiplexing (WDM) to transmit a plurality of time division multiplexed optical signals along a single optical fiber to increase the information transmission rate. System 1025 includes a local primary subsystem 1027, which includes a plurality of transmitter-receiver subsystems. A first local transmitter-receiver subsystem 1026 operates at a first wavelength $\lambda_1$ and a second local transmitter-receiver subsystem 1028 operates at a second wavelength $\lambda_2$. Although only 2 subsystems are shown, a WDM-OTDM system of the invention can have N transmitter-receiver subsystems, where N is a number greater than 2 such as at least about 10, such as 40 or more. The ith transmitter-receiver subsystems operates at a wavelength $\lambda i$, where $\lambda i$ is preferably in the infrared, such as from about 1530 to about 1600 nanometers.

Transmitter-receiver subsystems 1026, 1028 are identical to local subsystem 655 discussed above. Subsystem 1026 outputs an OTDM optical signal 1029 at a wavelength $\lambda_1$ and subsystem 1028 outputs an OTDM signal 1030 at a wavelength $\lambda_2$. OTDM signals 1029, 1030 are multiplexed to form a WDM-OTDM optical signal 1031 by a wavelength division multiplexer 1032. As understood in the art, wavelength division multiplexers enable light from two or more optical sources of different wavelength to be launched into a single optical fiber with minimal loss of optical power. Wavelength division multiplexer 1032 can comprise any optical element that enables multiplexing, such as, for example, an angularly dispersive multiplexer or filter. Waveguide multiplexers, such as directional couplers, may also be used. WDM-OTDM optical signal 1031 is transmitted, such as via an optical fiber 1033, into an optical network.

System 1025 also includes a remote primary subsystem 1034, which includes a wavelength division demultiplexer 1044, which has a structure identical to a wavelength demultiplexer 1043 discussed below and a wavelength division multiplexer 1045, which has a structure identical to wavelength multiplexer 1032 discussed above. Demultiplexer 1044 splits optical signal 1031 into a first channel 1046 carrying optical signal 1029 of signal 1031 at a wavelength $\lambda_1$ and a second channel 1047 carrying optical signal 1030 of signal 1031 at a wavelength $\lambda_2$. To recover information from signals 1029, 1030, remote primary subsystem 1034 also includes a plurality of transmitter-receiver subsystems of identical construction with local subsystems 1026, 1028. For example, primary subsystem 1034 includes a remote transmitter receiver subsystem 1040 operating at wavelength $\lambda_1$ and a remote transmitter-receiver subsystem 1041 operating at wavelength $\lambda_2$. Remote transmitter receiver subsystems 1040, 1041 have structures identical to local subsystems 1026, 1028.

It is not necessary that remote subsystem 1034 have at least one transmitter receiver subsystem that operates at each wavelength of optical signal 1031. Rather, remote subsystem 1034 only requires a remote transmitter receiver subsystem operating at a wavelength $\lambda_i$ to recover information from an received optical pulse stream output by a transmitter operating at wavelength $\lambda_i$.

Remote primary subsystem 1034 transmits an WDM-OTDM optical signal 1050 having optical signals at wavelengths $\lambda_1$, $\lambda_2$. Optical signal 1050 is received by local primary subsystem 1027 and split into a first channel carrying an optical signal 1051 at a wavelength $\lambda_1$ and a second channel carrying an optical signal 1052 at a wavelength $\lambda_2$. Transmitter-receiver subsystems 1026, 1028 recover information from respective optical signals 1051, 1028 in a manner identical to the information recovery performed by transmitter receiver 655 discussed above.

EXAMPLE

The following Example demonstrates the selection and demodulation of an information carrying pulse stream of an OTDM signal using coherent detection. The Example includes the generation of a stream of short optical pulses, synthesis of an OTDM signal, and coherent detection of the OTDM signals using optical hybrids. Details of the setup and results are described next.

Generation of an Optical Pulse Stream

Figure 15:
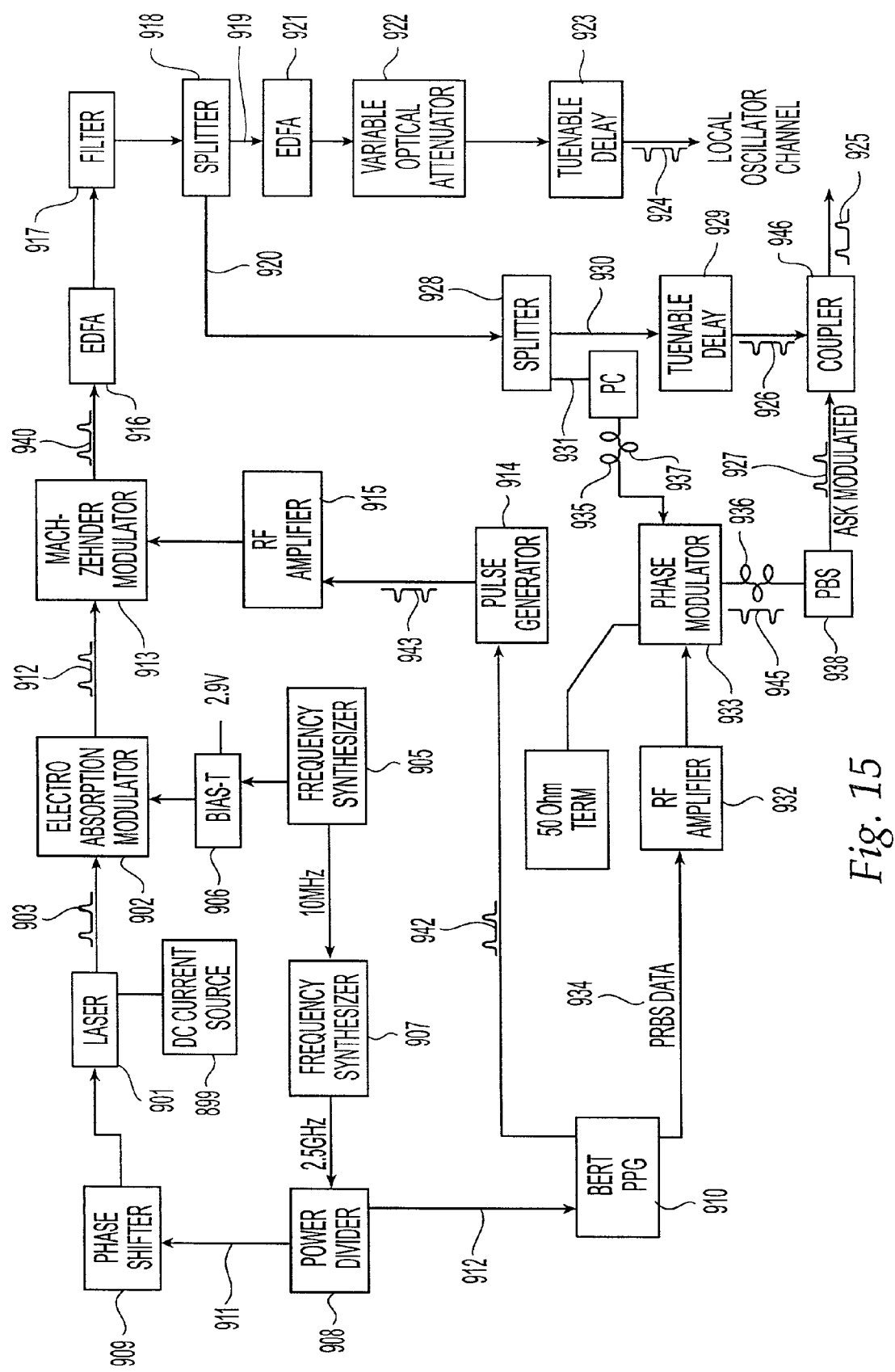
FIG. 15 shows an embodiment of a system for generating a TDM optical signal including a framing pulse stream according to the invention.

Referring to FIG. 15, an optical signal was generated in two stages using a gain-switched distributed feedback laser 901 (DFB laser) from JDS Uniphase (68824), which emitted a 2.5 GHz gain-switched pulse stream 903 having a wavelength at about 1542 nm. The laser was operated in gain switching mode to obtain output pulses having a short pulse width. In gain switching mode, rapid pumping causes the population inversion and gain to rise above lasing threshold before the laser oscillation has time to build up from the initial noise level in the cavity. To achieve gain switching, the DFB laser was biased with the sum of (1) a direct current signal 899, which biased the laser at just below the lasing threshold; and (2) a large-signal sinusoidal radio frequency (RF) signal at 2.5 GHz, which was output by a frequency synthesizer 907. The 2.5 GHz sinusoid was split into two channels 911, 912 by a power divider 908. First channel 911 was phase shifted by a phase shifter 909, which is discussed below, and input to laser 901. Second channel 912 drove a clock of a bit error rate tester pulse pattern generator (BERT-PPG) 910, which is discussed below.

The pulses the gain-switched optical pulse stream 903 have a full-width half maximum (FWHM) of about 44 ps and result from the peaks in the sinusoidal RF signal driving the DFB laser. The peaks in the driving signal rapidly increase the laser gain causing a large amount of stimulated emission, which quenches the laser output abruptly. A pulse was therefore generated for each peak in the RF signal. Because each pulse starts from amplified stimulated emission (ASE) noise, there is very little pulse-to-pulse correlation or coherence in contrast to mode-locked laser pulses.

The pulses of the optical pulse stream 903 are shaped and reduced to a FWHM of about 18 ps provide a 2.5 GHz optical pulse stream 912 using an electroabsorption modulator 902 (EAM), which was a model FOEA-230 obtained from JAE Electronics, Tualatin, Oreg. The optical pulse stream 903 was launched into the EAM 902, which was reverse-biased at 2.9 V through a bias-T 906 and driven by a 10 GHz sinusoidal signal output by a frequency synthesizer 905. The 10 GHz signal driving EAM 902 and the 2.5 GHz RF signals driving the laser 901 were phase locked using a 10 MHz reference signal output by the frequency synthesizer 905. With the proper bias voltage and RF drive voltage, the nonlinear transmission response of the EAM 902 provides a narrow time window of about 20 ps in which the optical absorption of the EAM 902 is sufficiently low for generally central portions of the laser pulses of pulse stream 903 to propagate through the EAM 902. The portions of each pulse falling outside the time window are attenuated thereby narrowing the pulse. The time window of low optical absorption was aligned to the pulses of optical pulse stream 903 by adjusting the phase of the 2.5 GHz signal driving the laser 901 relative to the 10 GHz signal driving the EAM 902 using phase shifter 909.

Figure 16:
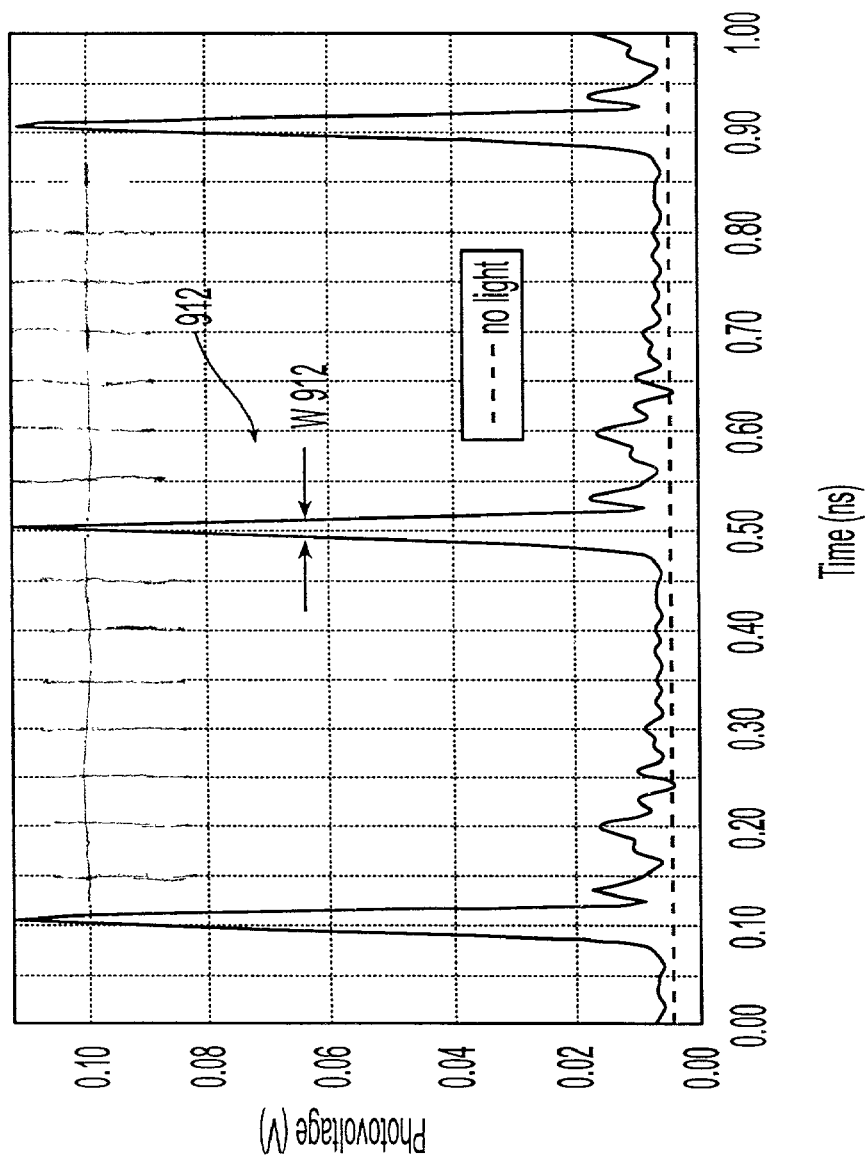
FIG. 16 shows laser pulses as output by an electro-absorption modulator of the system of FIG. 15.

Referring to FIG. 16, each pulse in optical pulse stream 912 output by EAM 902 has a FWHM $w_{912}$ of about 18 ps.

Returning to FIG. 15, the repetition rate of optical pulse stream 912 was reduced by a factor of 32 to obtain a 78.125 MHz optical pulse stream 940. The repetition rate reduction was accomplished as follows. Second channel 912 of the 2.5 GHz frequency synthesizer 907 was input to the clock input of BERT-PPG 910, which output a 2.5 GHz clock output 942. A pulse generator 914 accepted clock output 942 and divided the 2.5 GHz frequency by 32 to produce a 78.125 MHz electrical pulse stream 943 having pulses 200 ps in width. Pulse stream 943 was amplified 915 and used to drive a LiNbO3 electro-optic Mach-Zehnder modulator 913, which extinguished pulses of optical pulse stream 912 that did not fall within the 200 ps time window of the driving pulses. Thus, the optical pulse stream 940 output by modulator 913 had a frequency of 78.125 MHZ.

The 78.125 MHz optical pulse stream 940 was then amplified using an erbium doped fiber amplifier (EDFA) 916, filtered 917, and split 918 into first and second channels 919, 920. First channel 919 was amplified 921, input to a variable optical attenuator (VOA) 922, and a tuneable delay 923, which was of the variable air gap type. An output optical framing pulse stream 924 of tuneable delay 923 was input to the detector as a local oscillator channel, as discussed below.

OTDM Signal Synthesis

Second channel 920 output from splitter 918 was used to generate an OTDM signal 925. The OTDM signal 925 consists of two optical pulse streams each having a 78.125 MHz bit rate. A verification pulse stream 926 is used for verification and includes bit values of 1 only. A second pulse stream 927 includes ASK modulated data at 78.125 MHZ.

To obtain the two optical pulse streams 926, 927, channel 920 was split by a splitter 928 into first and second channels 930, 931 each carrying an optical pulse stream. First channel 930 was input to a variable air gap tuneable delay 929. Verification pulse stream 926 was the output of the tuneable delay 929.

Second channel 931 was input to a polarization controller 937 and a JDS LiNbO$_3$ phase modulator 933, which output a polarization modulated optical pulse stream 945. Polarization controller 937 adjusted the input polarization state of the optical pulse stream into the phase modulator 933 to maximize the modulation polarization efficiency. Modulator 933 modulated the pulses of the input optical pulse stream to represent a 2.5 Gb/s pseudo random binary sequence (PRBS) data stream 934 generated by BERT-PPG 910. The word length of the PRBS data stream was 127 bits. Thus, any given bit of the PRBS data stream repeated at a rate of 2.5/32 GHz. A polarization controller 936 and a polarization beam splitter 938 converted the polarization modulated pulse stream 945 to ASK optical pulse stream 927. Optical pulse streams 926, 927 were combined to form OTDM optical signal 925 using a 50/50 fiber coupler 946.

Coherent Detection

Figure 17:
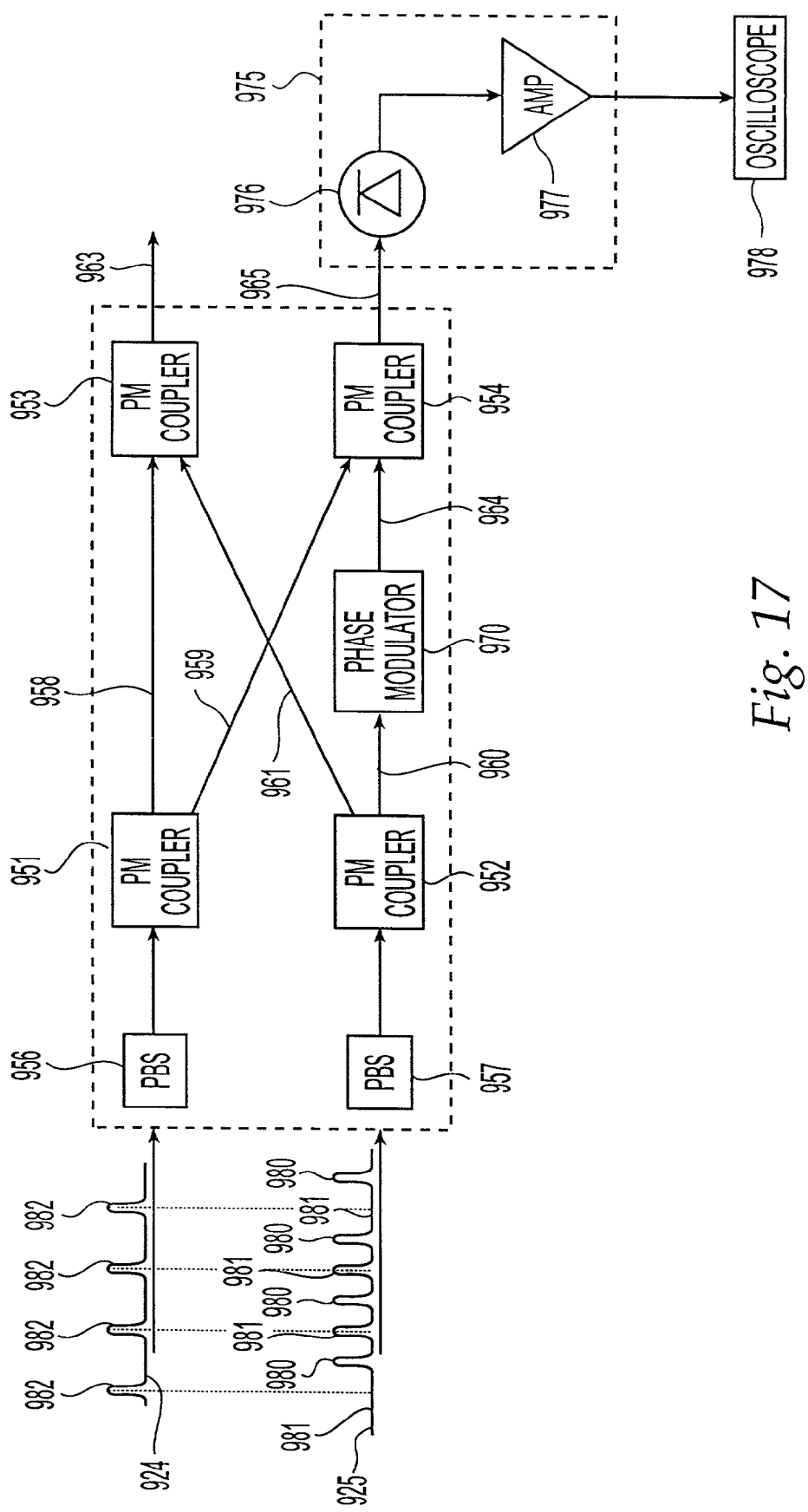
FIG. 17 illustrates an embodiment of a hybrid and detector used to recover information from the TDM signal generated by the system of FIG. 15 according to the invention.

Referring to FIG. 17, coherent detection was demonstrated using a 90° hybrid 950 and photoreceiver 975 as follows. Framing pulse channel 924 and OTDM optical signal 925 were input to polarization beam splitters (PBS) 956, 957, respectively. The output of PBS 956 was input to polarization maintaining fiber coupler 951, which produced first and second output channels 958, 959. The output of PBS 957 was input to polarization maintaining fiber coupler 952, which produced third and fourth output channels 960, 961. The polarization beam splitters ensured that the output of each PBS 956, 957 was linearly polarized, which minimized polarization dependent losses introduced by the particular polarization-maintaining fiber couplers used for this Example. In general, however, losses introduced by polarization-maintaining fiber couplers are not a strong function of the polarization state of the input optical signal.

Remaining with FIG. 17, output channels 958, 961 were combined in a polarization maintaining fiber coupler 953, which output channel 963. Output channel 960 was input to a phase modulator 970, Micro Photonix Integration, Phoenix, Ariz., which produced a phase modulated output channel 964. Output channel 959 and phase modulated output channel 964 were combined with a polarization maintaining fiber coupler 954 to output channel 965. Phase modulator 970 was used to ensure that a relative phase difference of 90° was maintained between the outputs of couplers 953, 954.

Photoreceiver 975, which is a model 1544LF 12 GHz photoreceiver obtained from New Focus, San Jose, Calif., includes only a single photodiode 976. Thus, only one of channels 963, 965 output by hybrid 950 can be detected using photoreceiver 975. The disadvantage of detecting only one channel is that the unwanted adjacent channel cancellation benefits of a balanced photoreceiver are not observed. In the present Example, channel 965 impinged upon photodiode 976, which output a current proportional to the square of the incident electric field, which is given by the sum of the electric fields resulting from the optical signals from channels 959, 964. The current output by photodiode 976 is amplified and converted to a voltage by a transimpedance amplifier 977. A 40-GHz sampling oscilloscope monitored the output of photoreceiver 975.

Coherently Detected Signals

Referring to FIGS. 18–21, the oscilloscope outputs that resulted from coherently detecting the OTDM signal 925 using hybrid 950 are shown. Recall that OTDM signal 925 includes contributions from two optical pulse streams, verification pulse stream 926, which includes only pulses 980 representing bit values of 1, and ASK modulated pulse stream 927, which includes pulses 981 modulated to represent the bit values of a PRBS. OTDM signal 925 and framing pulse channel 924 are combined at hybrid 950 for detection. For example, as shown in FIG. 16, to detect pulses of the ASK modulated pulse stream 927, tuneable delay 923 is adjusted to overlap the pulses 982 of framing pulse stream 924 with the ASK modulated pulse stream 927 of OTDM signal 925.

Oscilloscope 978 operated in sampling mode to sample the photodiode outputs produced by a plurality of different pulses and produce an output representative of a single pulse. Because successive bit periods of pulse stream 927 contain a repeating pseudo random binary sequence of pulses corresponding to bit values of 1's and 0's, the oscilloscope triggering was synchronized with the repetition rate of the 127 bit PRBS pattern. In this way, pulses corresponding to either bit values of 1's or 0's could be selectively displayed.

Figure 18:
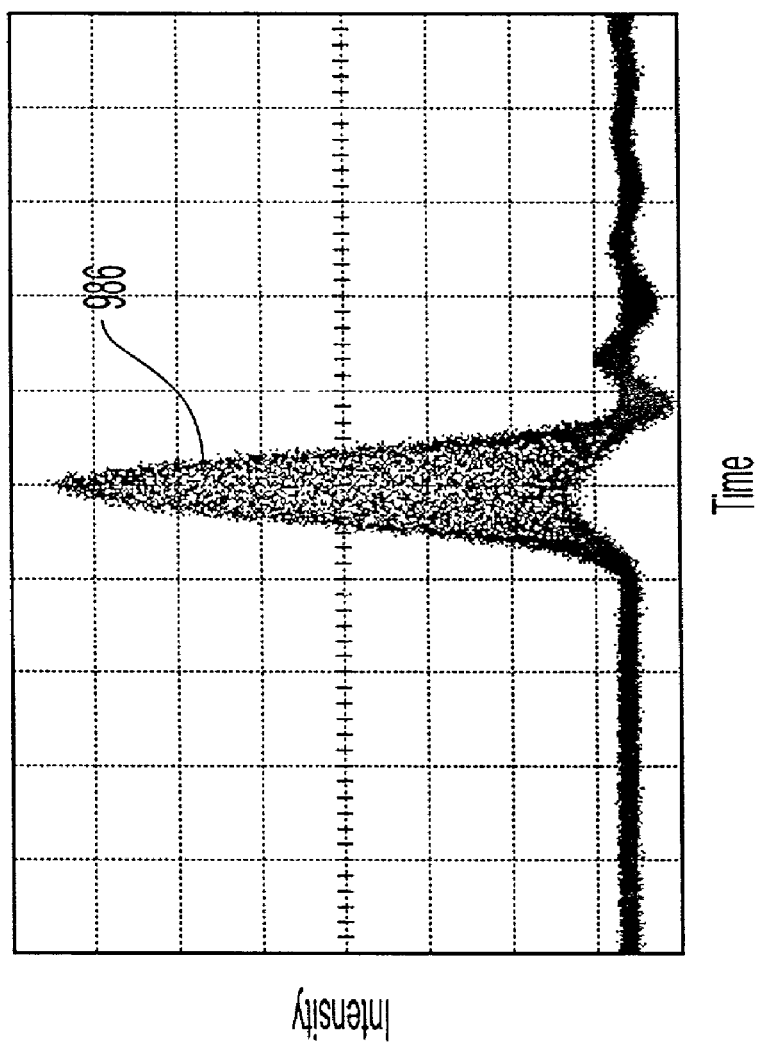
FIGS. 18–21 show intensity-time signals output by the detector of FIG. 17.
Figure 19:
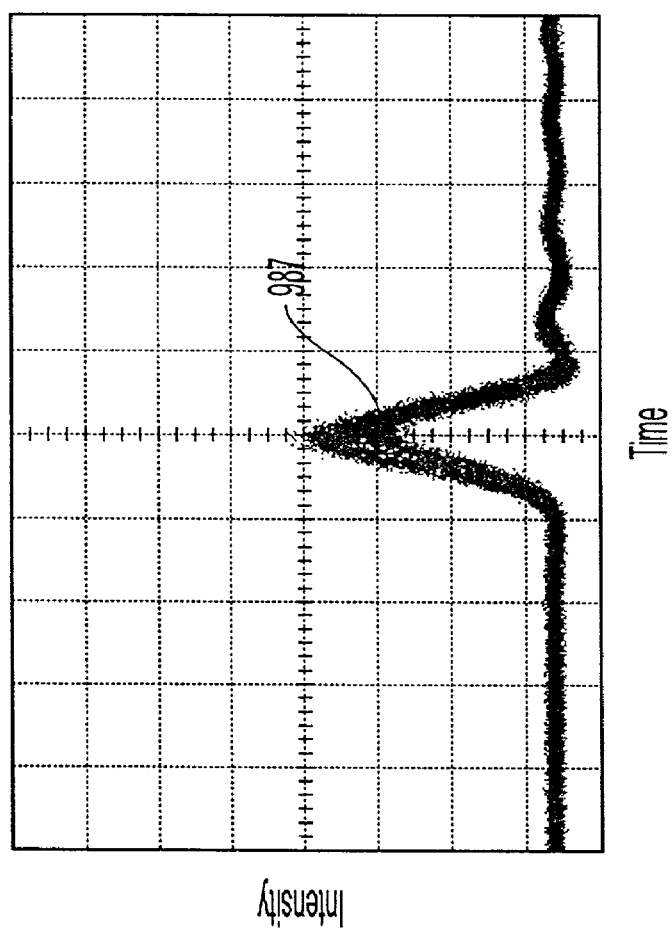
Figure 20:
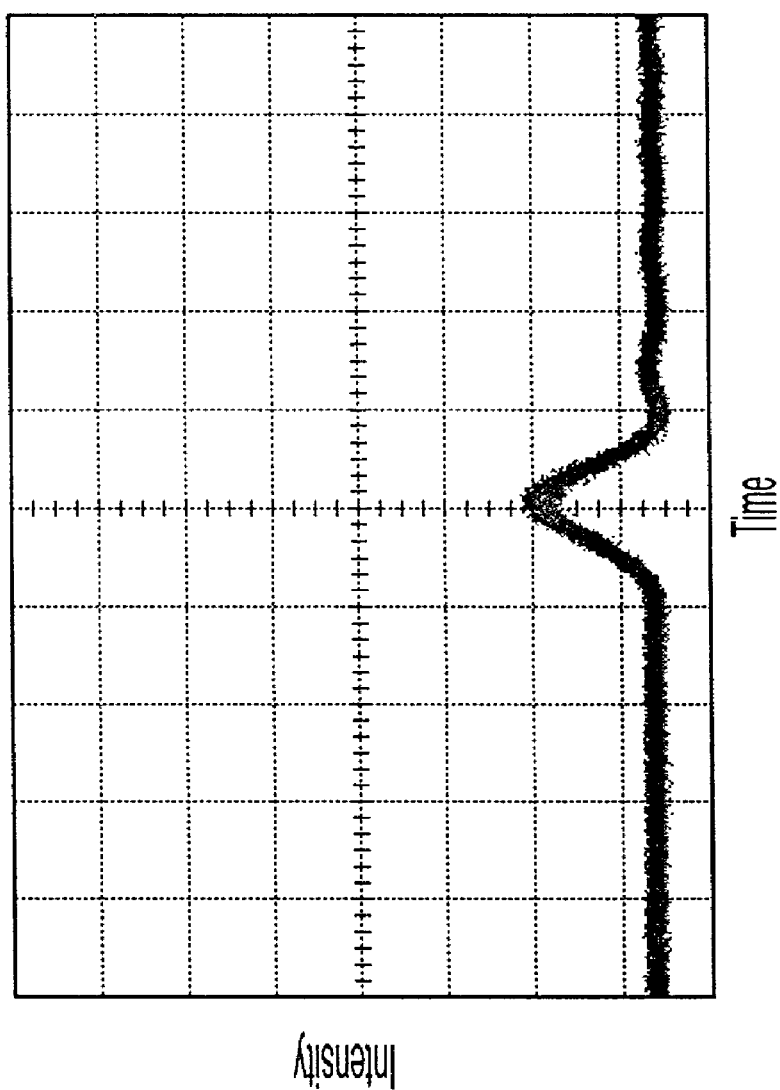
Figure 21:
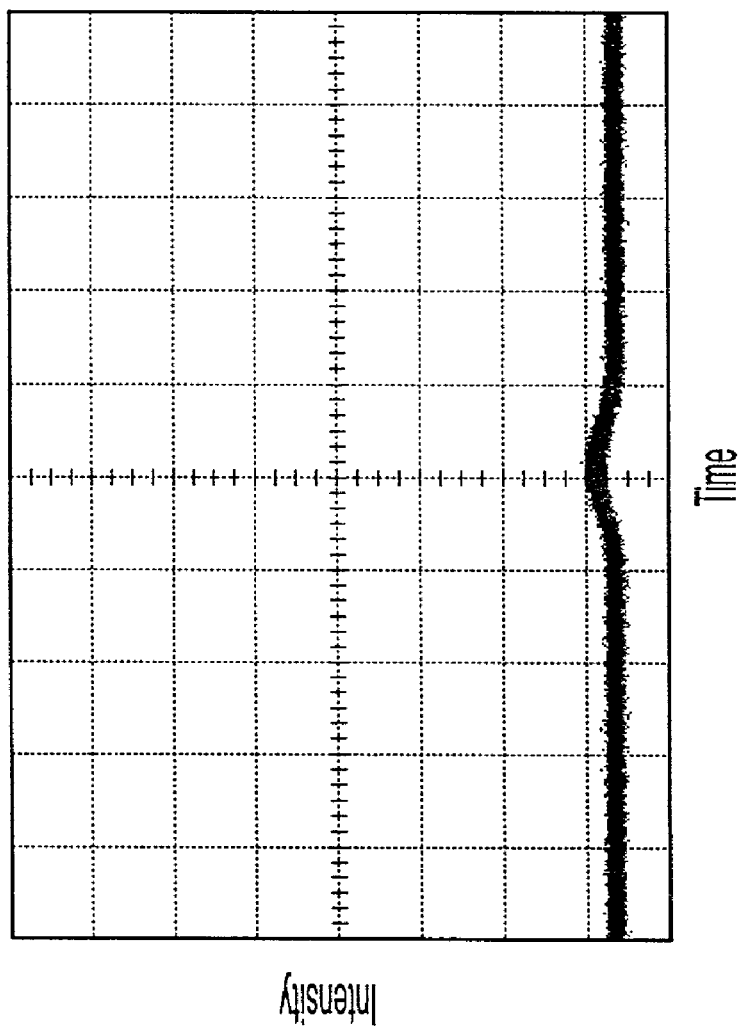

Referring to FIG. 18, the sampled photodiode output 986 is shown for the case in which the framing pulse channel is synchronized with the ASK modulated pulse stream and the oscilloscope triggering is synchronized with the photodiode output produced by the overlap of the framing pulses with a pulse representing a bit value of 1. Variation in the intensity of the output 986 is caused by a slight time varying frequency mismatch between the framing pulse stream and the ASK modulated pulse stream. Nonetheless, the output 986 clearly exceeds the output 987, shown in FIG. 19, which results when the oscilloscope triggering intervals are timed to correspond to pulses having bit values of 0. In the absence of overlap between the framing pulse stream and pulses of ASK pulse stream 927, the detector output is reduced as shown in FIGS. 19 and 20 for ASK pulses corresponding to bit values of 1 and 0, respectively. These results demonstrate that coherent detection of an OTDM signal can be used to perform data recovery comprising pulse selection and demodulation. Performing coherent detection with a balanced photoreceiver would further reduce the intensity of the photodiode outputs with no local oscillator.

Figure 22:
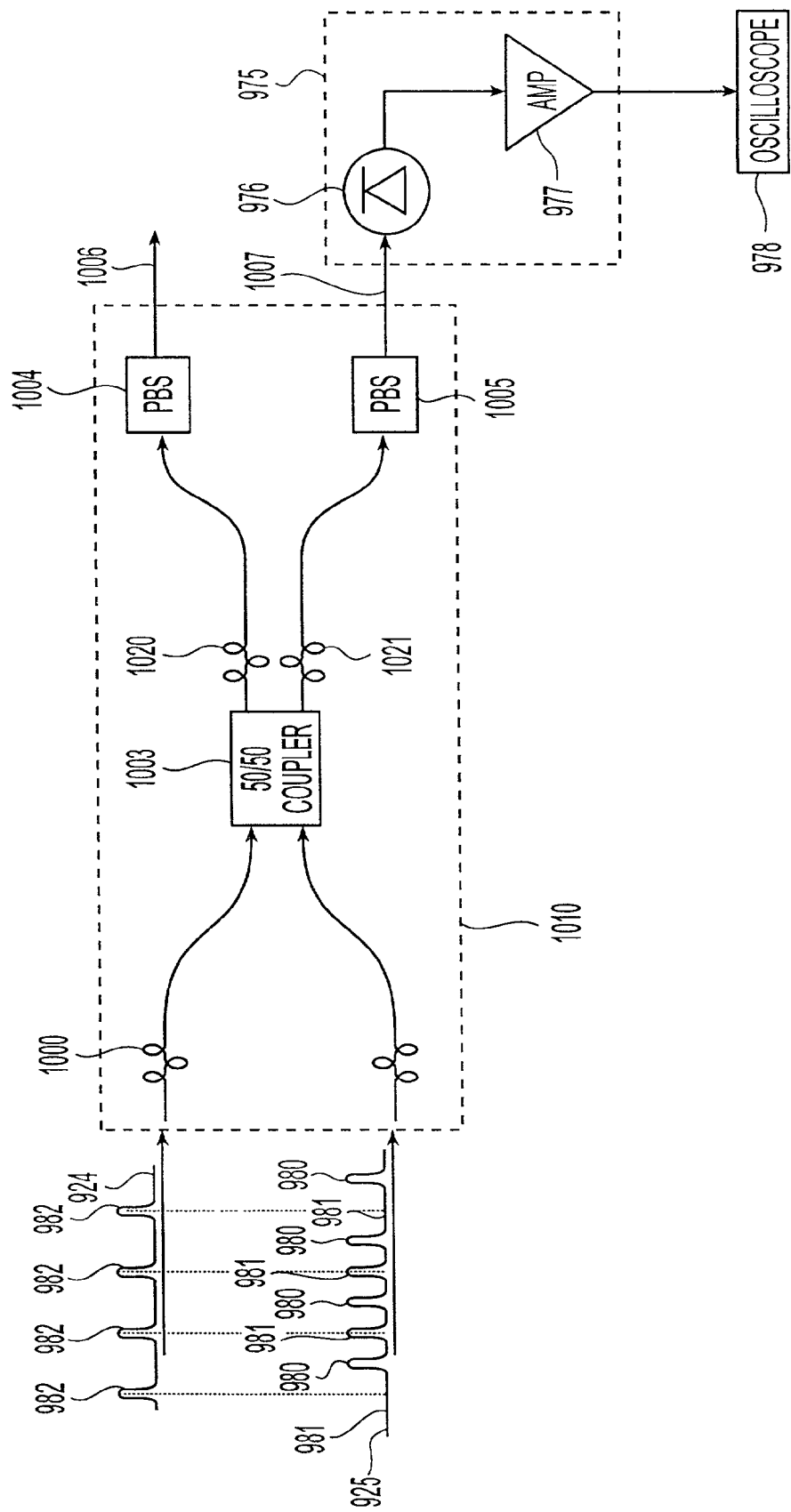
FIG. 22 illustrates a second embodiment of a hybrid and detector used to recover information from the TDM signal generated by the system of FIG. 15 according to the invention.
Figure 23:
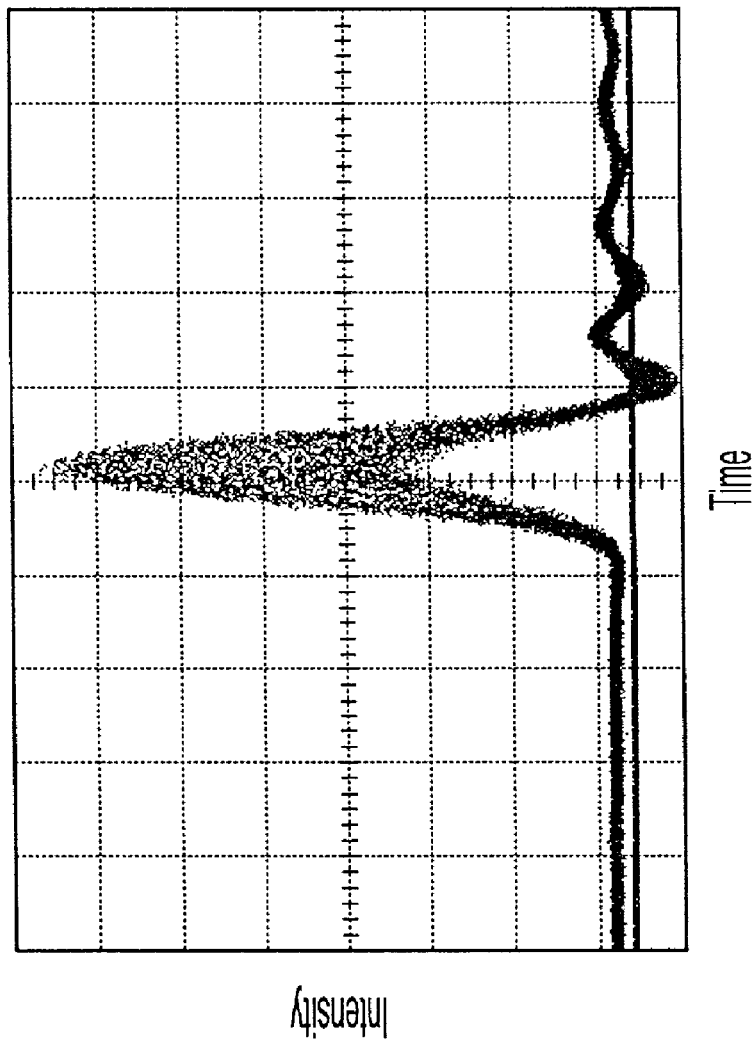
FIGS. 23–24 show intensity-time signals output by the detector of FIG. 22.
Figure 24:
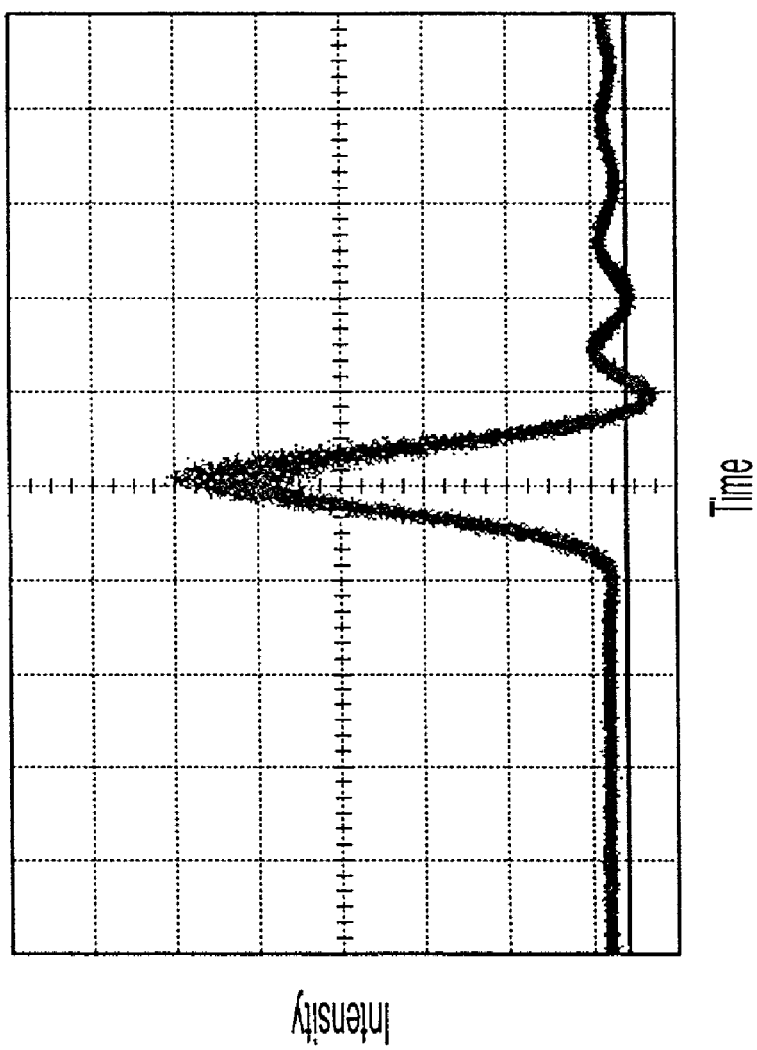

Referring to FIG. 22, a hybrid 1010 was also used to demonstrate coherent detection. Hybrid 1010 included a 2×2 3-dB coupler 1003, polarization controllers 1000, 1001, 1020, 1021 and polarization beam splitters 1004, 1005. One of the optical outputs of hybrid 1010, channel 1007 was detected by photoreceiver 975 and oscilloscope 978, as discussed above. FIGS. 23, 24 show the photodiode output resulting from ASK pulses corresponding to bit values of 1 and 0, respectively.

While the above invention has been described with reference to certain preferred embodiments, it should be kept in mind that the scope of the present invention is not limited to these. Thus, one skilled in the art may find variations of these preferred embodiments which, nevertheless, fall within the spirit of the present invention, whose scope is defined by the claims set forth below.

What is claimed is:

1. A time division multiplexed optical communication receiver for a received time division multiplexed optical signal, comprising:
   a light sensitive detector for detecting at least a first optical pulse stream of the time division multiplexed optical signal; the time division multiplexed optical signal having a plurality of interleaved optical pulse streams, each optical pulse stream including a plurality of optical pulses;
   an optical hybrid coupled to the light sensitive detector and configured to coherently mix the first optical pulse stream and a second optical pulse stream, pulses of the first optical signal and second optical pulse streams configured to simultaneously impinge upon the detector; wherein the first optical signal is a part of the time division multiplexed optical signal; and
   wherein the optical hybrid and light sensitive detector are configured to provide the receiver with dual functions of, (i) first optical pulse stream selection and (ii) data recovery for first optical pulse stream, and
   wherein the second optical pulse stream is a framing pulse stream of the time division multiplexed optical signal with a pulse period that is N times larger than a period of the received time division multiplexed optical signal, wherein N is the number of interleaved pulsed optical streams within the recived time division multiplexed signal.

2. The receiver of claim 1, further comprising a synchronization device to synchronize pulses of the first optical pulse stream with pulses of the second optical pulse stream.

3. The receiver of claim 2, wherein the synchronization device and the optical hybrid are configured to select the first optical pulse stream when pulses of the second pulse stream coincide with pulses of the first pulse stream, the pulses of the first pulse stream being a part of the received time division multiplexed optical signal with multiple interleaved pulsed optical streams.

4. The receiver of claim 1, wherein the time division multiplexed optical signal is received from a first transmitter and the second optical pulse stream is received from a second transmitter.

5. The receiver of claim 4, wherein the first transmitter is a remote transmitter, and the second transmitter is a local transmitter.

6. The receiver of claim 1, wherein optical pulses of the time division multiplexed signal have a width of less than about 100 ps.

7. The receiver of claim 1, wherein the optical pulses of the time division multiplexed signal comprise at least one of return-to-zero pulses, and short pulses.

8. The receiver of claim 1, wherein the receiver is a balanced receiver with at least four balanced light detectors.

9. The receiver of claim 1, wherein the receiver is a phase-diversity receiver.

10. The receiver of claim 1, wherein the time division multiplexed signal is encoded with at least one of amplitude shift keying, phase shift keying, differential phase shift keying, and polarization shift keying.

11. The receiver of claim 1, wherein the receiver is a phase-polarization diversity receiver.

* * * * *

UNITED STATES PATENT AND TRADEMARK OFFICE
CERTIFICATE OF CORRECTION

PATENT NO. : 7,110,677 B2  Page 1 of 1
APPLICATION NO. : 09/962339
DATED : September 19, 2006
INVENTOR(S) : Reingand et al.

It is certified that error appears in the above-identified patent and that said Letters Patent is hereby corrected as shown below:

Claim 1 to be corrected as (The changes are underlined): Col. 24 Line 7-33 please insert 1. A time division multiplexed optical communication receiver for a received time division multiplexed optical signal, comprising:
a light sensitive detector for detecting at least a first optical pulse stream of the time division multiplexed optical signal; the time division multiplexed optical signal having a plurality of interleaved optical pulse streams, each optical pulse stream including a plurality of optical pulses;
an optical hybrid coupled to the light sensitive detector and configured to coherently mix the first optical pulse stream and a second optical pulse stream, pulses of the first optical signal and second optical pulse streams configured to simultaneously impinge upon the detector; wherein the first optical signal is a part of the time division multiplexed optical signal; and wherein the optical hybrid and light sensitive detector are configured to provide the receiver with dual funcitons of,
(i) first optical pulse stream selection and
(ii) data recovery for <u>the</u> first optical pulse stream, and
wherein the second optical pulse stream is a framing pulse stream of the time division multiplexed optical signal with a pulse period that is N times larger than a period of the received time division multiplexed optical signal, wherein N is the number of interleaved pulsed optical streams within the rec<u>e</u>ived time division multiplexed signal.

Signed and Sealed this

Second Day of January, 2007

JON W. DUDAS
*Director of the United States Patent and Trademark Office*